United States Patent
Chang et al.

(10) Patent No.: US 11,423,292 B2
(45) Date of Patent: Aug. 23, 2022

(54) CONVOLUTIONAL NEURAL-NETWORK CALCULATING APPARATUS AND OPERATION METHODS THEREOF

(71) Applicant: INDUSTRIAL TECHNOLOGY RESEARCH INSTITUTE, Hsinchu (TW)

(72) Inventors: Kuo-Chiang Chang, Zhudong Township (TW); Shien-Chun Luo, Kaohsiung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 352 days.

(21) Appl. No.: 16/860,381

(22) Filed: Apr. 28, 2020

(65) Prior Publication Data

US 2021/0256359 A1 Aug. 19, 2021

(30) Foreign Application Priority Data

Feb. 15, 2020 (TW) ................................ 109104865

(51) Int. Cl.
*G06F 13/40* (2006.01)
*G06N 3/063* (2006.01)
(Continued)

(52) U.S. Cl.
CPC ......... *G06N 3/063* (2013.01); *G06F 9/30032* (2013.01); *G06F 9/3893* (2013.01); *G06F 9/4881* (2013.01)

(58) Field of Classification Search
CPC ... G06N 3/063; G06F 9/30032; G06F 9/3893; G06F 9/4881
See application file for complete search history.

(56) References Cited

U.S. PATENT DOCUMENTS 5,471,627 A 11/1995 Means et al.
10,394,929 B2 * 8/2019 Tsai ........................ G06N 3/063
(Continued)

FOREIGN PATENT DOCUMENTS

CN 104077233 A 10/2014
CN 107341544 A 11/2017
(Continued)

OTHER PUBLICATIONS

Chen et al., "DaDianNao: A Machine-Learning Supercomputer", 47th Annual IEEE/ACM International Symposium on Microarchitecture, 2014, pp. 609-622.
(Continued)

*Primary Examiner* — Cheng Yuan Tseng
(74) *Attorney, Agent, or Firm* — Birch, Stewart, Kolasch & Birch, LLP

(57) ABSTRACT

A convolutional neural-network calculating apparatus including a bidirectional-output operation module and a data scheduler is provided. The bidirectional-output operation module includes a number of bidirectional-output operators, a number of row-output accumulators, and a number of column-output accumulators. Each bidirectional-output operator has a row-output port and a column-output port. The row-output accumulators are coupled to the row-output ports, and the column-output accumulators are coupled to the corresponding column-output ports. The data scheduler is configured to provide a number of values of an input data and a number of convolution values of the convolution kernels to the bidirectional-output operators. In a first operation mode, the bidirectional-output operators output operation results to the corresponding column-output accumulators through the column-output ports. In a second operation mode, the bidirectional-output operators output operation
(Continued)

results to the row-output accumulators through the row-output ports.

22 Claims, 19 Drawing Sheets

(51) Int. Cl.
*G06F 9/38* (2018.01)
*G06F 9/30* (2018.01)
*G06F 9/48* (2006.01)

(56) References Cited

U.S. PATENT DOCUMENTS

| | | | |
|---|---|---|---|
| 10,713,214 B1 * | 7/2020 | Shalev | G06F 17/16 |
| 10,915,297 B1 * | 2/2021 | Halutz | G06F 17/153 |
| 11,042,795 B2 * | 6/2021 | Zhang | G06N 3/0472 |
| 11,120,101 B2 * | 9/2021 | Liu | G06N 3/063 |
| 11,194,549 B2 * | 12/2021 | Liu | G06F 7/5277 |
| 2011/0119467 A1 | 5/2011 | Cadambi et al. | |
| 2015/0254551 A1 | 9/2015 | Alvarez-Icaza Rivera et al. | |
| 2016/0379109 A1 | 12/2016 | Chung et al. | |
| 2018/0046913 A1 | 2/2018 | Yu et al. | |
| 2018/0089562 A1 | 3/2018 | Jin et al. | |
| 2018/0137414 A1 | 5/2018 | Du et al. | |
| 2018/0307973 A1 | 10/2018 | Fang et al. | |
| 2019/0171454 A1 | 6/2019 | Luo et al. | |
| 2020/0167405 A1 * | 5/2020 | Suk | G06T 1/20 |
| 2021/0019591 A1 * | 1/2021 | Venkatesh | G06N 3/04 |
| 2021/0110235 A1 * | 4/2021 | Hoang | G06N 3/082 |

FOREIGN PATENT DOCUMENTS

| | | | | |
|---|---|---|---|---|
| CN | 108241890 | A | | 7/2018 |
| CN | 108805266 | A | | 11/2018 |
| CN | 109656623 | B | | 6/2019 |
| CN | 110188869 | A | | 8/2019 |
| CN | 111325321 | A | * | 6/2020 |
| EP | 3671748 | A1 | * | 6/2020 |
| EP | 3674982 | A1 | * | 7/2020 |
| EP | 3298546 | B1 | * | 12/2021 ......... G06F 15/8023 |
| TW | 201824096 | A | | 7/2018 |
| TW | 201931215 | A | | 8/2019 |

OTHER PUBLICATIONS

Chen et al., "Eyeriss: A Spatial Architecture for Energy-Efficient Dataflow for Convolutional Neural Networks", ACM/IEEE 43rd Annual International Symposium on Computer Architecture, 2016, pp. 367-379.

Lee et al., "UNPU: A 50.6TOPS/W Unified Deep Neural Network Accelerator with 1b-to-16b Fully-Variable Weight Bit-Precision", IEEE International Solid-State Circuits Conference, 2018, Session 13 /Machine Learning and Signal Processing / 13.3, total 3 pages.

Shin et al., "DNPU: An 8.1TOPS/W Reconfigurable CNN-RNN Processor for General-Purpose Deep Neural Networks", IEEE International Solid-State Circuits Conference, 2017, Session 14 / Deep-Learning Processors / 14.2, total 3 pages.

Song et al., "An 11.5TOPS/W 1024—MAC Butterfly Structure Dual-Core Sparsity-Aware Neural Processing Unit in 8nm Flagship Mobile SoC", IEEE International Solid-State Circuits Conference, 2019, Session 7 / Machine Learning / 7 .1, total 3 pages.

Yamada et al., "A 20.5TOPS and 217.3GOPS/mm$^2$ Multicore SoC with DNN Accelerator and Image Signal Processor Complying with ISO26262 for Automotive Applications", IEEE International Solid-State Circuits Conference, 2019, Session 7 / Machine Learning / 7.2, total 3 pages.

Taiwanese Office Action and Search Report for Taiwanese Application No. 109104865, dated Oct. 26, 2020.

* cited by examiner

CONVOLUTIONAL NEURAL-NETWORK CALCULATING APPARATUS AND OPERATION METHODS THEREOF

This application claims the benefit of Taiwan application Serial No. 109104865, filed Feb. 15, 2020, the disclosure of which is incorporated by reference herein in its entirety.

TECHNICAL FIELD

The disclosure relates in general to a convolutional neural-network calculating apparatus and an operation method of a convolutional neural-network using the same.

BACKGROUND

In the operation of the CNN (Convolutional Neural-Network) model, the operation time is almost determined according to the amount of operation and the data transmission amount in convolution operation. In recent years, the trend of development is directed not only to increase the precision but also to reduce the amount of operation and the data transmission amount in convolution operation. The CNN operation possesses the characteristics of high parallelism and high dependency, which co-exist but contradict with each other. Therefore, it has become an important task in the present technology field to speed up the operation of the CNN model.

The conventional CNN operation has 6 dimensions, including the output height (OH), the output width (OW), the input channel (IC) (=kernel channel, KC), the kernel height (KH), the kernel width (KW), and the output channel (OC) (=kernel number, KR). High "parallelism" occurs at the multiplication of the data in the channel direction of input and the data in the channel direction of convolution kernels. The operation of multiplication requires a large amount of parallelized multiplication and addition array. High "dependency" occurs at the multiplication of the data in the height direction and the width direction of input and the data in the height direction and the width direction of convolution kernels. The operation of multiplication requires a special designed order in data input to incorporate the parallelized multiplication and addition array.

However, various important CNN models have distinct characteristics, making it difficult to achieve a high efficiency operation. The first scenario is: when the operation involves different channel dimensions, the efficiency of the calculating apparatus will be poor. Let the Resnet model and the MobileNet model be taken for example. The Resnet model has deep kernel channels (64~2048 channels), but the MobileNet model has both deep kernel channels (such as 64~512 channels) and depth-wise kernel channels (equal to 1). Moreover, the depth-wise channel operation of the MobileNet model is different from the conventional convolution operation. The input channel dimension and the output channel dimension are irrelevant with each other in the conventional convolution operation but must be identical in the depth-wise convolution operation. The convolution kernels used in the above two CNN models have two sizes of height×width: 3×3 and 1×1.

For calculating the depth-wise convolution, the conventional architecture design uses 3×3=9 multipliers as a unit array to speed up the processing of convolution kernels whose height and width are 3×3. Such architecture is applicable to the operation of the depth-wise kernel channels, but will have a poor utilization rate when used in the operation of deep kernel channels and 1×1 convolution kernels. For the deep kernel channels, the conventional architecture design uses 32~64 multipliers to process the multiplication and accumulation of deep channels, but will have a poor utilization rate when used in the operation of depth-wise kernel channels.

Another scenario is: the height and width of convolution kernels have different dimensions, and therefore deteriorate the efficiency of the calculating apparatus. Let the above Resnet model and the MobileNet model be compared with the Inception model. The convolution kernels of the Resnet model and the MobileNet model have two types of height and width, namely. 1×1 and 3×3, but the convolution kernels of the Inception model have several types, such as 1×7, 7×1, 1×3, and 3×1.

For the convolution kernels whose height and width are 1×7, 7×1, 1×3, 3×1, the conventional architecture design uses 3×3=9 multiplier as a unit array to speed up the processing of the 3×3 convolution kernels. Such architecture is applicable to the operation of the 3×3 convolution kernels, but will have a poor utilization rate when the height and width of the convolution kernels are 1×7, 7×1, 1×3, or 3×1.

Therefore, it has become an important prominent task for the industries to provide a hardware architecture of the CNN calculating apparatus capable of achieving good hardware efficiency in the convolution operation of convolution kernels with different heights, widths, and numbers of channels.

SUMMARY

According to one embodiment, a convolutional neural-network calculating apparatus including a bidirectional-output operation module and a data scheduler is provided. The bidirectional-output operation module includes a number of bidirectional-output operators, a number of row-output accumulators, and a number of column-output accumulators. Each bidirectional-output operator has a row-output port and a column-output port. The row-output accumulators are coupled to the row-output ports, and the column-output accumulators are coupled to the corresponding column-output ports. The data scheduler is configured to provide a number of values of an input data and a number of convolution values of the convolution kernels to the bidirectional-output operators. In a first operation mode, the bidirectional-output operators output operation results to the corresponding column-output accumulators through the column-output ports. In a second operation mode, the bidirectional-output operators output operation results to the row-output accumulators through the row-output ports.

According to another embodiment, an operation method of a convolutional neural-network is provided. The operation method includes the following steps. A bidirectional-output operation module is provided. The bidirectional-output operation module includes a number of bidirectional-output operators, a number of row-output accumulators, and a number of column-output accumulators. Each bidirectional-output operator has a row-output port and a column-output port, the row-output accumulators are coupled to the row-output ports, and the column-output accumulators are coupled to the corresponding column-output ports. A number of data values of an input data and the convolution values of the convolution kernels are provided to the bidirectional-output operators by a data scheduler. Operation results are outputted to the corresponding column-output accumulators through the column-output ports by the bidirectional-output operators in a first operation mode. Operation results are outputted to the row-output accumulators through the row-output ports by the bidirectional-output operators in a second operation mode.

The above and other aspects of the disclosure will become better understood with regard to the following detailed description of the preferred but non-limiting embodiment(s). The following description is made with reference to the accompanying drawings.

Figure 1:
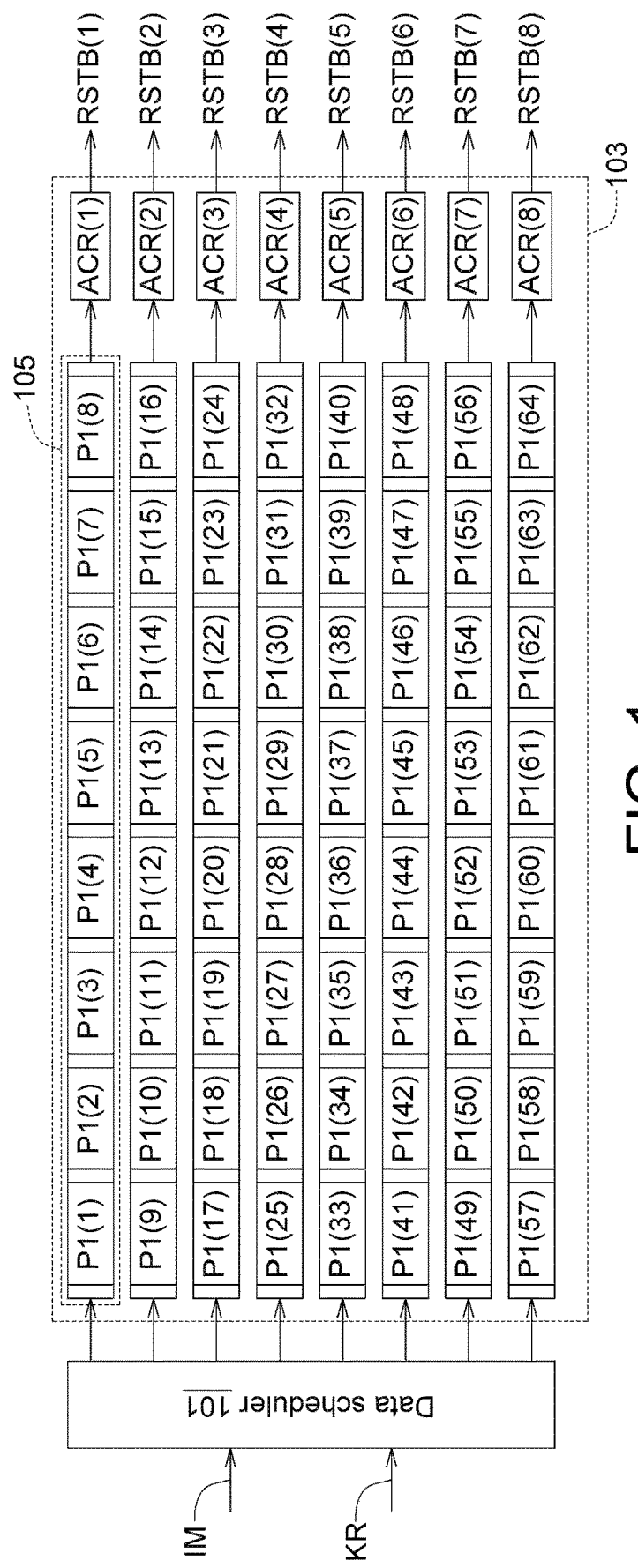
FIG. 1 is a schematic diagram of a convolutional neural-network calculating apparatus processing deep convolution and depth-wise convolution.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Let the CNN operation of the MobileNet model as listed in Table 1 be taken for example. The MobileNet model includes the convolution operation of different channels arranged according to the order below. One of the features of the MobileNet model is that the deep convolution operation and the depth-wise convolution operation are performed alternately. As indicated in Table 1, the output channels, OC, of conventional convolution operations of odd-numbered layers, including the $1^{st}$ layer, the $3^{rd}$ layer, the $5^{th}$ layer, the $7^{th}$ layer, the $9^{th}$ layer, the $11^{th}$ layer and $13^{th}$ layer, are 32, 64, 128, 128, 256, 256 and 512 respectively, and the kernel channels, KC, of the depth-wise convolution operations of even-numbered layers, including the $2^{nd}$ layer, the $4^{th}$ layer, the $6^{th}$ layer, the $8^{th}$ layer, the $10^{th}$ layer, and the $12^{th}$ layer all are equal to 1. Moreover, the input channel dimension and the output channel dimension are irrelevant with each other in the conventional convolution operation but must be identical in the depth-wise convolution operation.

TABLE 1

Convolution operations of MobileNet model

| Sequence of layers | Type/Stride | Dimension of the convolution kernels<br>For conventional convolution in the odd layers, dimension = (KH × KW × IC × OC), where IC = KC, and OC = KR in this case.<br>For depth-wise convolution, noted dw in the even layers, dimension = (KH × KW × OC), where the OC = IC = KR, and KC = 1 in this case. |
|---|---|---|
| 1 | Conv/s2 | 3 × 3 × 3 × 32 |
| 2 | Conv dw/s1 | 3 × 3 × 32 (dw) |
| 3 | Conv/s1 | 1 × 1 × 32 × 64 |
| 4 | Conv dw/s2 | 3 × 3 × 64 (dw) |
| 5 | Conv/s1 | 1 × 1 × 64 × 128 |
| 6 | Conv dw/s1 | 3 × 3 × 128 (dw) |
| 7 | Conv/s1 | 1 × 1 × 128 × 128 |
| 8 | Conv dw/s2 | 3 × 3 × 128 (dw) |
| 9 | Conv/s1 | 1 × 1 × 128 × 256 |
| 10 | Conv dw/s1 | 3 × 3 × 256 (dw) |
| 11 | Conv/s1 | 1 × 1 × 256 × 256 |
| 12 | Conv dw/s2 | 3 × 3 × 256 (dw) |
| 13 | Conv/s1 | 1 × 1 × 256 × 512 |

Referring to FIG. 1, a schematic diagram of a convolutional neural-network calculating apparatus processing deep convolution and depth-wise convolution is shown. The convolutional neural-network calculating apparatus includes a data scheduler 101 and an operation module array 103. The operation module array 103 has a number of unidirectional operation modules 105, each including a number of unidirectional multipliers. When the operation module array 103 includes 8 unidirectional operation modules 105, and each unidirectional operation module 105 includes 8 unidirectional multipliers P1, then the operation module array 103 will include 64 multipliers P1(1)~P1(64) in total. When performing the conventional convolution operation, such as the $3^{rd}$ layer of the MobileNet model, the data scheduler will allocate 8 identical values of the input data IM to the multipliers in each column, arranged according to the channel dimension, that is, P1(1)=P1(9)= . . . =P1(57), P1(2)=P1(10) . . . =P1(58), . . . , P1(8)=P1(16)= . . . P1(64). Meanwhile, the data scheduler allocates 8 different convolution kernels KR to the multipliers in each column, wherein each convolution kernel has 8 values, arranged according to the channel dimension, and there are 64 values in total. The above calculation of 8 different convolution kernels KR is based on the shared input data IM. On the other hand, when performing the depth-wise convolution operation for the second layer of the MobileNet model which has a channel of 1, the input data and the channel dimension data must be separated, and the input data cannot be shared, that is, P1(1)≠P1(9)≠ . . . ≠P1(57). The conventional convolution operation adds up the input data and the channel dimension data. When the architecture of conventional data scheduler and convolutional neural-network calculating apparatus is used, in the first clock cycle, only the multiplier P1(1) of the 8 multipliers of each unidirectional operation module 105 could be allocated to perform convolution operation, and the remaining 63 multipliers will remain idled. In the second clock cycle, still only the P1(1) multiplier could be allocated to perform convolution operation, and the remaining 63 multipliers will remain idled. By the same analogy, when the convolutional neural-network calculating apparatus performs the operation of a CNN model (such as: the Mobile-Net model) with a large amount of depth-wise convolution operation, the hardware efficiency of the multipliers of the calculating apparatus will be greatly decreased, and the required time for completing the depth-wise CNN operation will be significantly increased.

To avoid the hardware being idled and increase operation efficiency, a convolutional neural-network calculating apparatus is provided according to an embodiment of the present disclosure. The convolutional neural-network calculating apparatus includes a bidirectional-output operation module and a data scheduler. The bidirectional-output operation module includes a number of bidirectional-output operators, a number of row-output accumulators, and a number of column-output accumulators. Each bidirectional-output operator has a row-output port and a column-output port. The row-output accumulators are coupled to the row-output ports, and the column-output accumulators are coupled to the corresponding column-output ports. The data scheduler is configured to provide a number of data values (such as a number of pixel values) of an input data (such as an input image) and the convolution values of the convolution kernels to the bidirectional-output operators. In a first operation mode, the data scheduler provides the data order required in the first operation mode to the bidirectional-output operators which accordingly output operation results to the corresponding column-output accumulators through the column-output ports for the processing of depth-wise convolution operation. In a second operation mode, the data scheduler provides the data order required in the second operation mode to the bidirectional-output operators which accordingly output operation results to the corresponding row-output accumulator through the row-output ports for the processing of conventional convolution operation.

According to an embodiment of the present disclosure, an operation method of a convolutional neural-network is provided. The operation method includes the following steps. In the first step, whether to use a first operation mode or a second operation mode is determined according to a convolution operation dimension parameter. In the second step, the above convolution operation dimension parameter is provided to the data scheduler. In the third step, data is transmitted to the bidirectional-output operators of the bidirectional-output operation module by the data scheduler. In the first operation mode, the bidirectional-output operators output operation results to the corresponding column-output accumulators through the column-output ports. In the second operation mode, the bidirectional-output operators output operation results to the row-output accumulators through the row-output ports.

The bidirectional-output operators include MR bidirectional multipliers P2(1)~P2(MR). The column-output accumulators include MR column-output accumulators ACC(1)~ACC(MR). When the convolutional neural-network calculating apparatus is set to the first operation mode, an $i^{th}$ bidirectional multiplier P2($i$) of the MR bidirectional multipliers outputs a $1^{st}$ sub-convolution operation result in a first clock cycle, and outputs a $2^{nd}$ sub-convolution operation result in a second clock cycle. The $i^{th}$ column-output accumulator ACC($i$) adds up the $1^{st}$ sub-convolution operation result and the $2^{nd}$ sub-convolution operation result. Detailed descriptions are disclosed below.

Figure 2A:
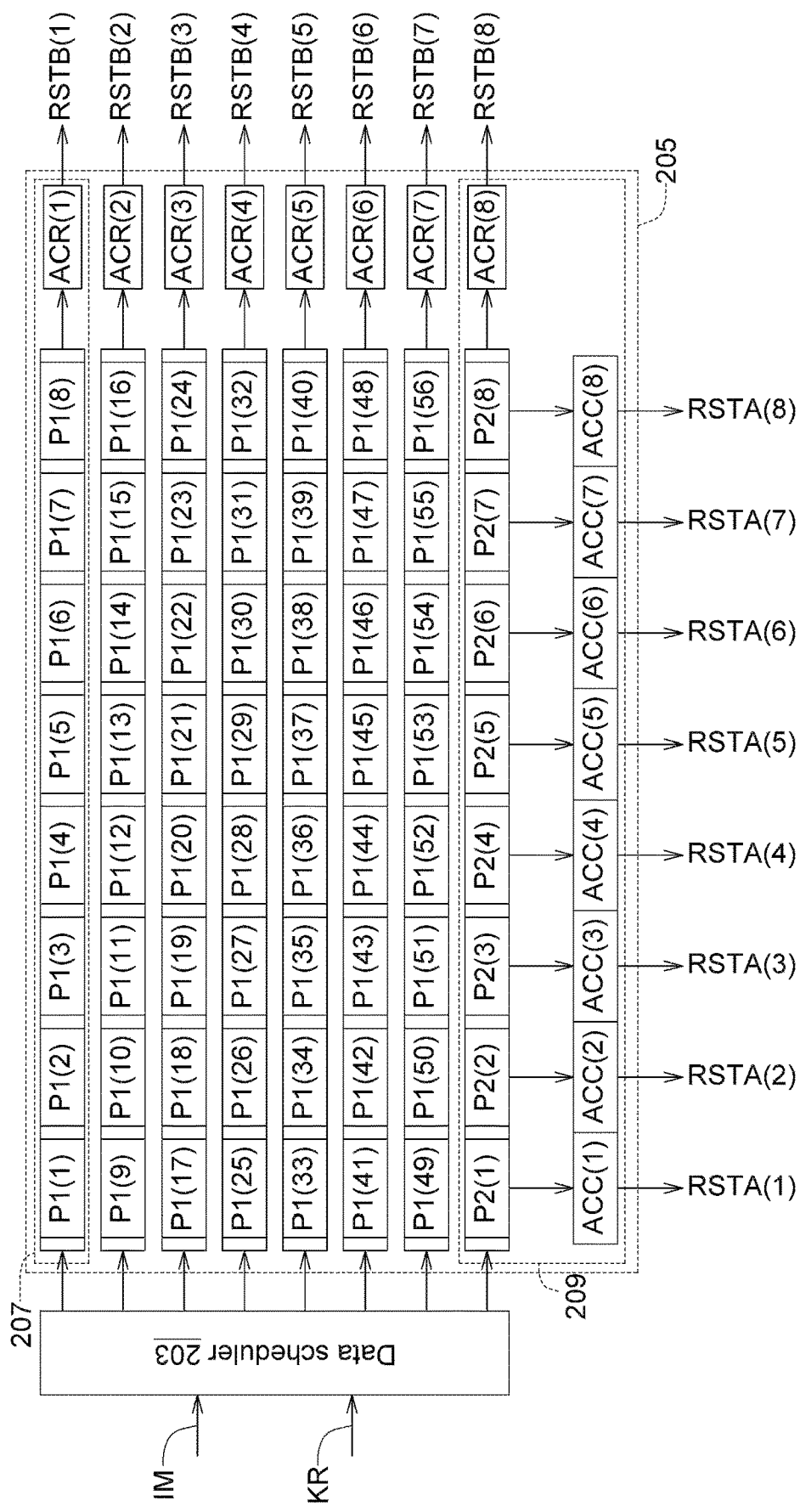
FIG. 2A is a block diagram of a convolutional neural-network calculating apparatus according to an embodiment of the present disclosure.

Referring to FIG. 2A, a block diagram of a convolutional neural-network calculating apparatus according to an embodiment of the present disclosure is shown. The convolutional neural-network calculating apparatus performs convolutional neural-network operation to an input data IM according to a number of convolution kernels KR. The convolutional neural-network calculating apparatus 200 includes a data scheduler 203 and an operation module array 205. The operation module array 205 has MC operation modules, wherein MC is a positive integer representing the number of multipliers per column. The MC operation modules include at least one bidirectional-output operation module 209. Each bidirectional-output operation module 209 includes MR bidirectional multiplier. Each unidirectional operation module 207 includes MR unidirectional multiplier, wherein MR is a positive integer representing the number of multipliers per row. In the present embodiment as indicated in FIG. 2A, MC=8, MR=8, but the present embodiment is not limited thereto. The operation module array 205 has 8 operation modules. For example, the first to the $7^{th}$ operation module are unidirectional operation modules 207, and the $8^{th}$ operation module is a bidirectional-output operation module 209. In the present embodiment, it is taken for example that one operation module is the bidirectional-output operation module 209, but the present embodiment is not limited thereto. The $1^{st}$ unidirectional operation module 207 includes 8 unidirectional multipliers P1(1)~P1(8). The $2^{nd}$ unidirectional operation module 207 includes 8 unidirectional multipliers P1(9)~P1(16). By the same analogy, the $7^{th}$ unidirectional operation module 207 includes 8 unidirectional multipliers P1(49)~P1(56), and the bidirectional-output operation module 209 in the $8^{th}$ row includes 8 bidirectional multipliers P2(1)~P2(8).

After receiving the input data IM and a number of convolution kernels KR, the data scheduler 203 outputs a number of data values of the input data IM and a number of convolution values of the convolution kernels KR to 8 operation modules for performing convolution operation according to different operation modules. As indicated in FIG. 2A, when the calculating apparatus is set to a first operation mode, the first convolution results RSTA(1)~RSTA(8) could be obtained from the column-output accumulators ACC(1)~ACC(8). When the calculating apparatus is set to a second operation mode, the second convolution results RSTB(1)~RSTB(8) could be obtained from the row-output accumulators ACR(1)~ACR(8). The data values of the input data IM received by the output multiplier in the same column are identical.

Figure 2B:
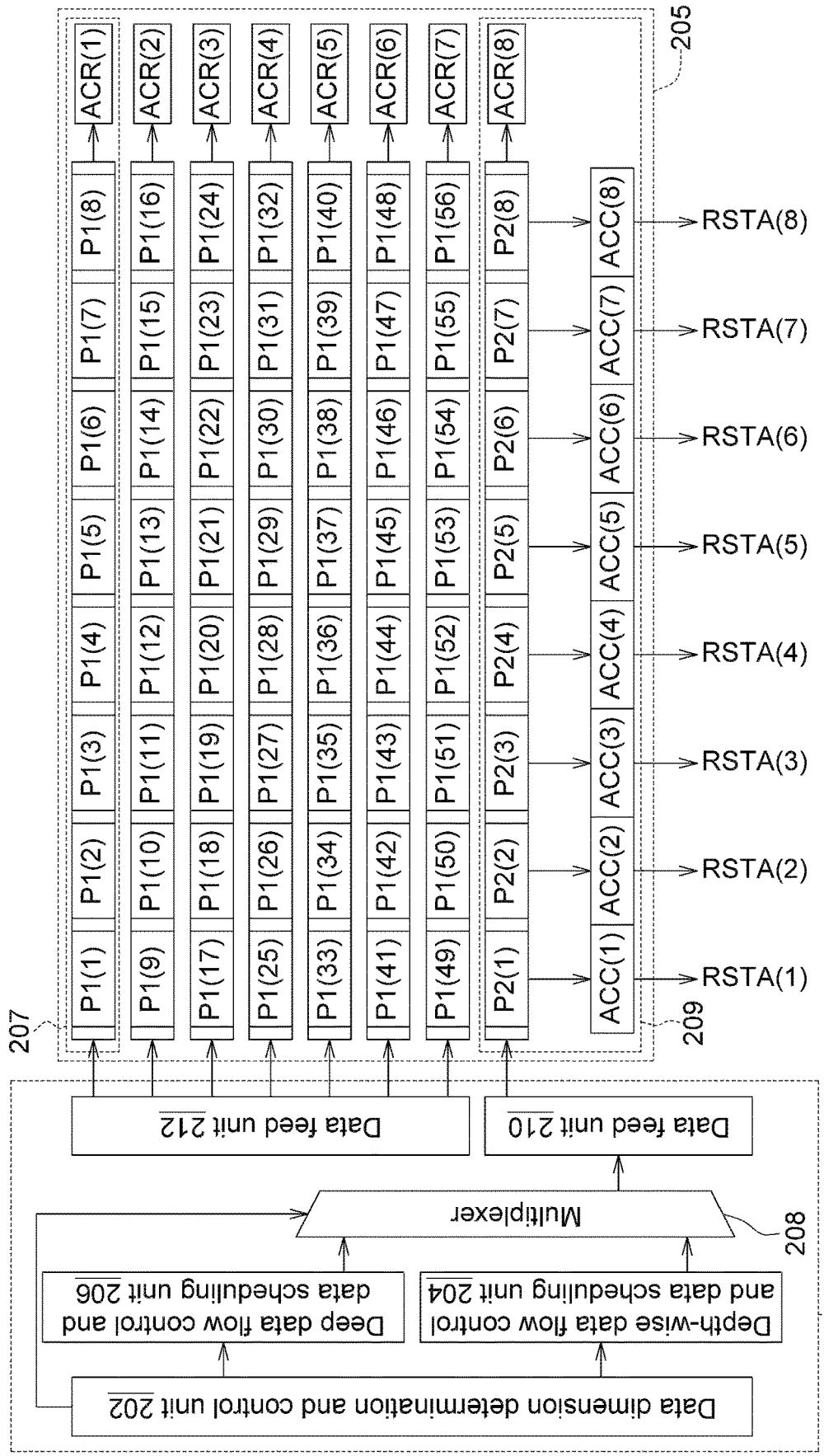
FIG. 2B is a block diagram of an example of detailed implementation of the convolutional neural-network calculating apparatus of FIG. 2A.

Referring to FIG. 2B, a block diagram of an example of detailed implementation of the convolutional neural-network calculating apparatus of FIG. 2A is shown. The data scheduler 203 could have different implementations. For example, the data scheduler 203 may include a data dimension determination and control unit 202, a first dimension data flow control and data scheduling unit (such as depth-wise data flow control and data scheduling unit 204), a second dimension data flow control and data scheduling unit (such as deep data flow control and data scheduling unit 206), a multiplexer 208 and a data feed unit 210. The depth-wise data flow control and data scheduling unit 204 is controlled by the data dimension determination and control unit 202 and is configure to output a first data value data flow and a first convolution value data flow according to a number of data values of the input data and the convolution values of the convolution kernels in the first operation mode (such as the depth-wise operation mode). The deep data flow control and data scheduling unit 206 is controlled by the data dimension determination and control unit 202 and configured to output a second data value data flow and a second convolution value data flow according to a number of data values of the input data IM and the convolution values of the convolution kernels in the second operation mode (such as the deep operation mode). The multiplexer 208 is coupled to the depth-wise data flow control and data scheduling unit 204 and the deep data flow control and data scheduling unit 206 and is configured to output the first data value data flow and the first convolution value data flow in the first operation mode, and to output the second data value data flow and the second convolution value data flow in the second operation mode. The data feed unit 210 is coupled to the multiplexer 208 and configured to output the first data value data flow and the first convolution value data flow to a number of bidirectional multipliers P2 (such as bidirectional multipliers P2(1)~P2(8)) in the first operation mode, and to output the second data value data flow and the second convolution value data flow to a number of bidirectional multipliers P2 (such as bidirectional multipliers P2(1)~P2(8)) in the second operation mode. The data scheduler 203 may further include a data feed unit 212. The data feed unit 212 outputs the data value data flow and the convolution value data flow adaptable to the unidirectional multipliers P1 in 7 rows to the unidirectional multipliers P1 in the 7 rows according to a number of data values of the input data and the convolution values of the convolution kernels in the second operation mode (such as the deep operation mode).

Figure 3:
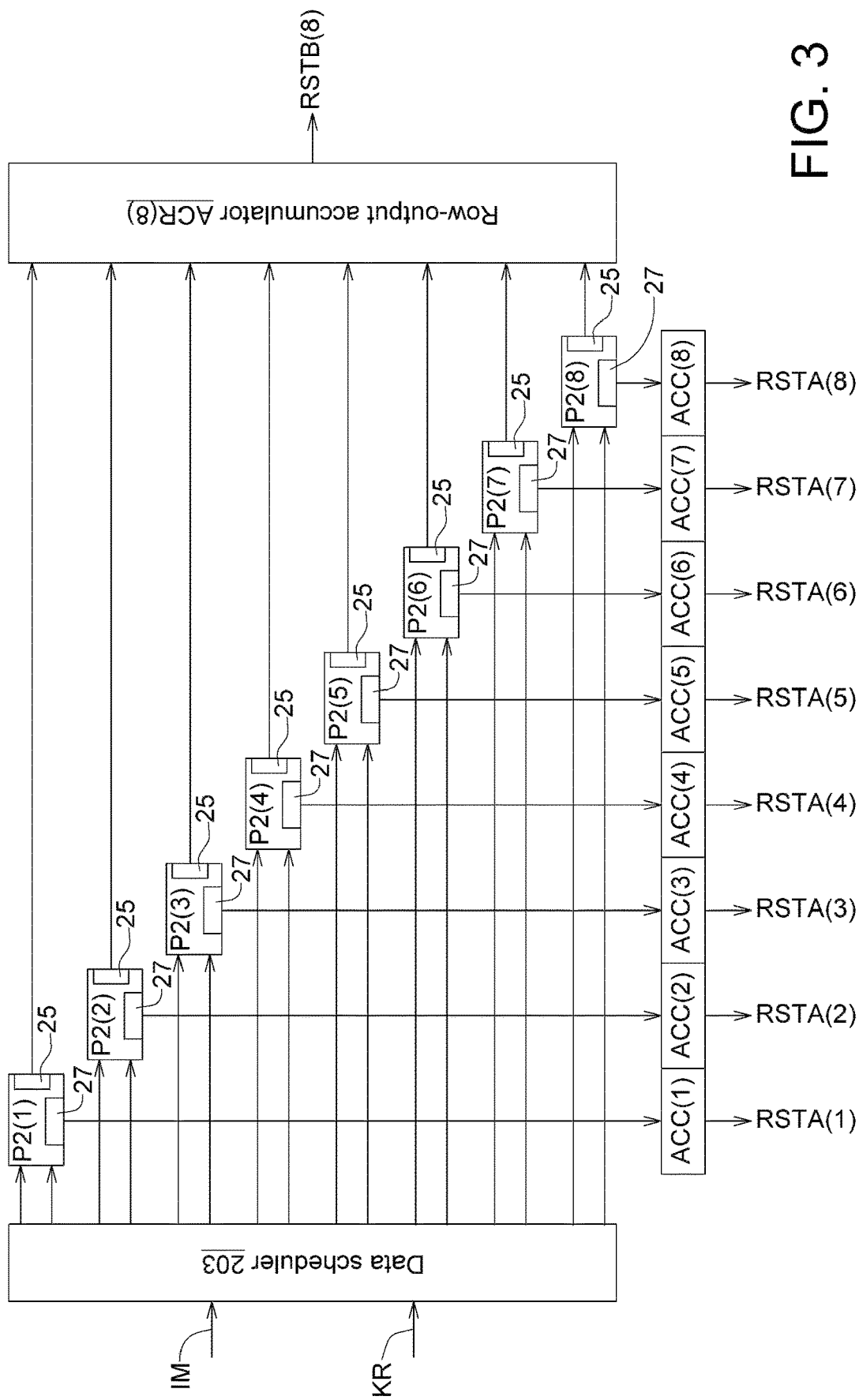
FIG. 3 is a block diagram of a bidirectional-output operation module of the calculating apparatus of FIG. 2A.

Referring to FIG. 3, a block diagram of a bidirectional-output operation module of the calculating apparatus of FIG. 2A is shown, In FIG. 3, a block diagram of an example of the $8^{th}$ operation module (the bidirectional-output operation module 209) of the calculating apparatus of FIG. 2A is shown. The bidirectional-output operation module 209 includes MR bidirectional multipliers P2(1)~P2(MR), a row-output accumulator ACR(m), and MR column-output accumulators ACC(1)~ACC(MR), wherein m is a positive integer between 1 and MC. In the present embodiment, MR=8, m=8, but the present embodiment is not limited thereto. In the present embodiment, the bidirectional-output operation module 209 has a row-output accumulator ACR(8), 8 column-output accumulators ACC(1)~ACC(8) and 8 bidirectional multipliers P2(1)~P2(8). Each of the 8 bidirectional multipliers P2(1)~P2(8) has a row-output port 25 and a column-output port 27.

As indicated in FIG. 3, the row-output accumulator ACR(8) is coupled to 8 row-output ports 25 of the 8 bidirectional multipliers P2(1)~P2(8). When performing convolution operation, the row-output accumulator ACR(8) firstly adds up the 8 sub-products obtained from the multiplication operation of the 8 bidirectional multipliers P2(1)~P2(8) in the first clock cycle to obtain a sum, which is used as an original second convolution result RSTB(8). Then, the 8 sub-products obtained from the multiplication operation of the 8 bidirectional multipliers P2(1)~P2(8) in the next cycle are added up to obtain a sum, which is further added to the original second convolution result RSTB(8) to obtain an updated second convolution result RSTB(8). In the following clock cycles, the 8 sub-products are added to obtain a sum, which is further added to the updated second convolution result RSTB(8) to obtain a once more updated second convolution result RSTB(8). The 8 column-output accumulators ACC(1)~ACC(8) are respectively coupled to one of the 8 column-output ports 27 of the 8 corresponding bidirectional multipliers P2(1)~P2(8). Let the first column-output accumulator ACC(1) be taken for example. The column-output accumulator ACC(1) is coupled to the column-output port 27 of the bidirectional multiplier P2(1). When performing convolution operation, the column-output accumulator ACC(1) firstly uses the sub-product obtained by one bidirectional multiplier P2(1) in the first clock cycle as an original first convolution result RSTA(1), then adds up the sub-products obtained by the bidirectional multiplier P2(1) in each subsequent clock cycle to the original first convolution result RSTA(1) to obtain an updated first convolution result RSTA(1).

Figure 4:
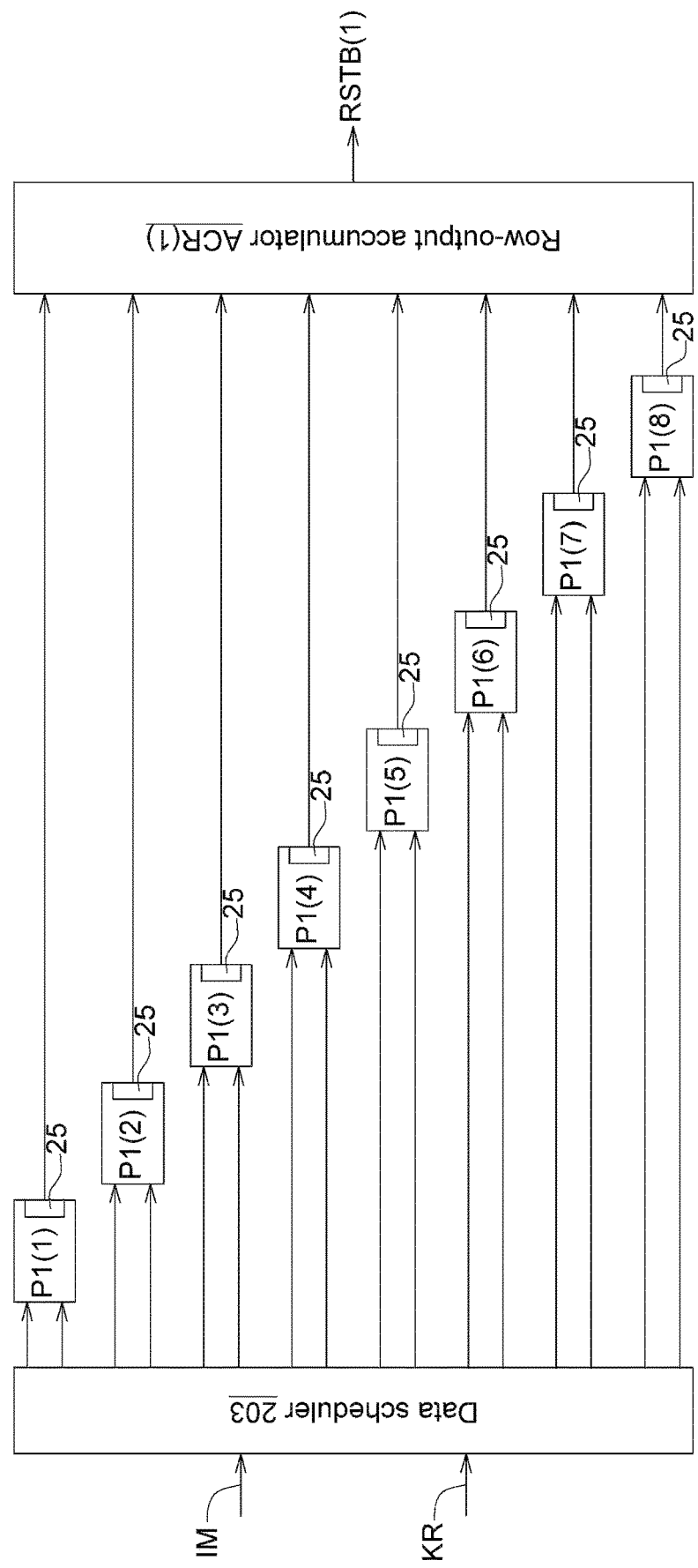
FIG. 4 is a block diagram of a unidirectional operation module of the calculating apparatus of FIG. 2A.

Referring to FIG. 4, a block diagram of a unidirectional operation module of the calculating apparatus of FIG. 2A is shown. In FIG. 4, a block diagram of an example of a unidirectional operation module 207 of the $1^{st}$ to the $7^{th}$ operation module of the calculating apparatus of FIG. 2A is shown. Each unidirectional operation module 207 includes MR unidirectional multipliers P1(1)~P1(MR), a number of row-output accumulators ACR(m), wherein m is a positive integer between 1 and MC. In the present embodiment, MR=8, MC=8, m=1, but the present embodiment is not limited thereto. In the present embodiment, each unidirectional operation module 207 has 8 unidirectional multipliers P1(1)~P1(8). Each of the 8 unidirectional multipliers P1(1)~P1(8) has a row-output port 25. As indicated in FIG. 4, the row-output accumulator ACR(1) of the $1^{st}$ unidirectional operation module 207 is coupled to the 8 row-output ports 25 of the 8 unidirectional multipliers P1(1)~P1(8). When performing convolution operation, the row-output accumulator ACR(1) firstly adds up the 8 sub-products obtained by the 8 unidirectional multipliers P1(1)~P1(8) in the first clock cycle to obtain a sum, which is used as an original second convolution result RSTB(1). Then, the sum of the 8 sub-products obtained by the 8 unidirectional multipliers P1(1)~P1(8) in each clock cycle is added to the original second convolution result RSTB(1) to obtain an updated second convolution result RSTB(1).

Figure 5A:
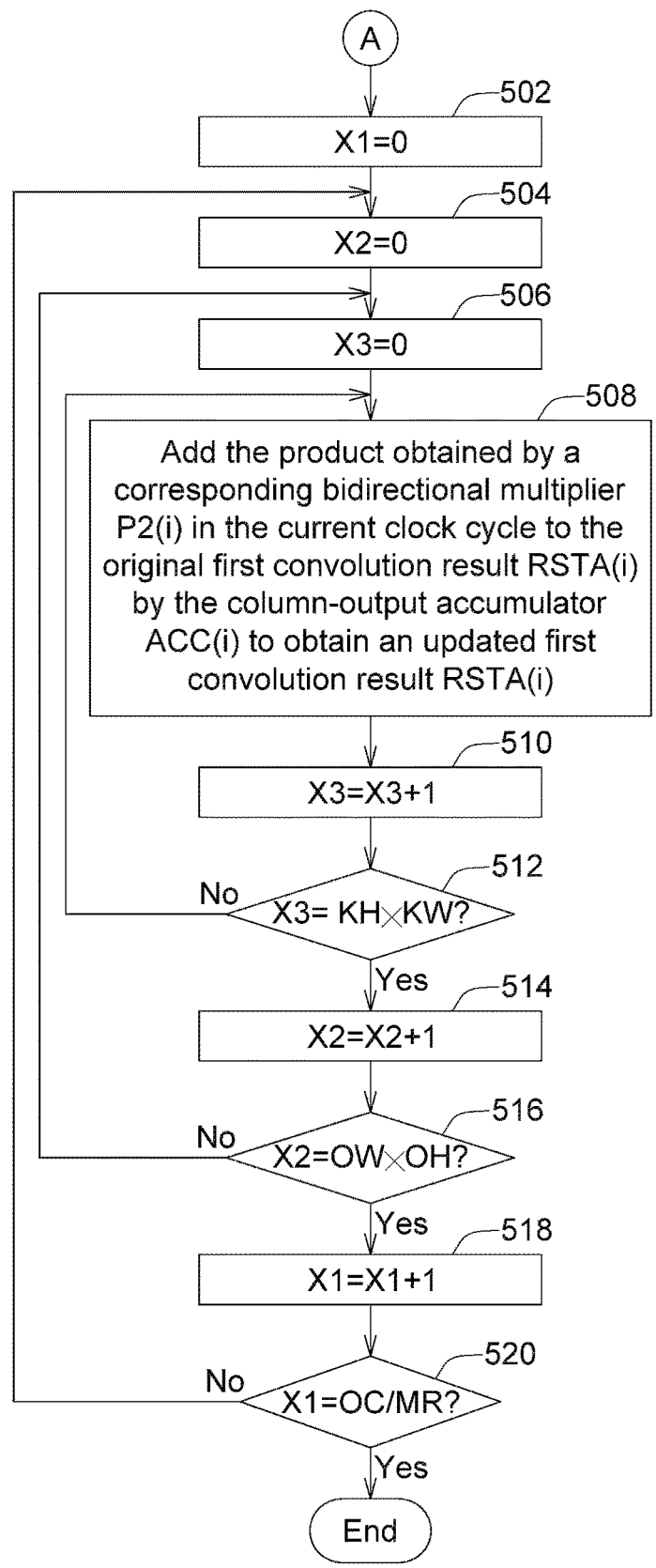
FIGS. 5A~5B are detailed flowcharts of the convolution neural-network operation method of FIG. 2A according to an embodiment of the present disclosure.
Figure 5B:
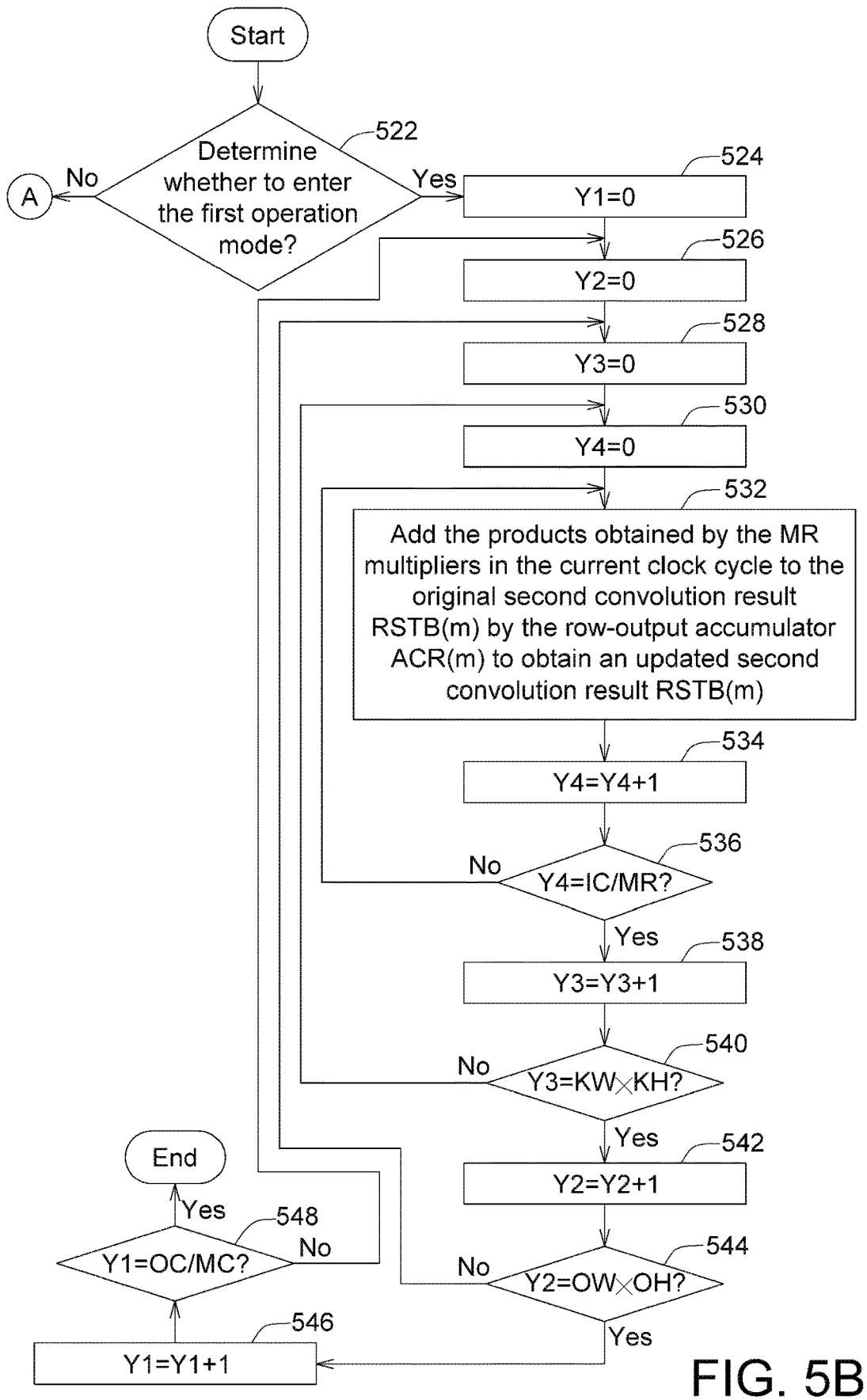

Referring to FIG. 5A~5B, detailed flowcharts of the convolution neural-network operation method of FIG. 2A according to an embodiment of the present disclosure are shown. Relevant parameters of the method includes: (a) the height, the width and the channel of the input data IM respectively are input data height H, input data width W and input data channel IC; (b) the height, the width and the channel of the convolution kernels KR respectively are convolution kernel height KH, convolution kernel width KW, and convolution kernel channel KC; and (c) the height, the width and the channel of convolution operation result respectively are convolution output height OH, convolution output width OW and convolution output channel OC. MR is a positive integer representing the number of multipliers per row; MC is a positive integer representing the number of multipliers per column.

In step 522 as indicated in FIG. 5B, whether to enter the first operation mode is determined according to, for example, whether the convolution kernel channel KC is greater than or equivalent to a specific value, such as MR, the number of multipliers per row. When the convolution kernel channel KC is less than the specific value, the convolutional neural-network calculating apparatus 200 is set to the first operation mode, such as a depth-wise operation mode; meanwhile, steps 502~520 are performed. When it is determined that the channel KC of the convolution kernel is greater than or equivalent to the specific value, the convolutional neural-network calculating apparatus 200 is set to the second operation mode, such as a deep operation mode, meanwhile, steps 524~548 are performed.

In step 502, the loop parameter X1 is set to 0. Then, the method proceeds to 504, the loop parameter X2 is set to 0. After that, the method proceeds to 506, the loop parameter X3 is set to 0. Then, the method proceeds to step 508, the product obtained by a corresponding bidirectional multiplier P2(i) in the current clock cycle is added to the original first convolution result RSTA(i) by the column-output accumulator ACC(i) to obtain an updated first convolution result RSTA(i), wherein i is a positive integer between 1 and MR.

Then, the method proceeds to step 510, 1 is added to the value of the loop parameter X3. After that, the method proceeds to 512, whether the loop parameter X3 is equivalent to the product of the convolution kernel height KH and the convolution kernel width KW is determined. When the determination is Yes, then the method proceeds to step 514; when the determination is No, then the method returns to step 508. In step 514, 1 is added to the value of the loop parameter X2. After that, the method proceeds to 516, whether the loop parameter X2 is equivalent to the product of the convolution output width OW and the convolution output height OH is determined. When the determination is Yes, then the method proceeds to step 518; when the determination is No, then the method returns to step 506. In step 518, 1 is added to the loop parameter X1. Then, the method proceeds to step 520, whether the loop parameter X1 is equivalent to the quotient of the convolution output channel OC divided by the number of multipliers per row MR is determined. When the determination is Yes, then the method terminates; when the determination is No, then the method returns to step 504.

In step 524, the loop parameter Y1 is set to 0. Then, the method proceeds to 526, the loop parameter Y2 is set to 0. After that, the method proceeds to 528, the loop parameter Y3 is set to 0. Then, the method proceeds to 530, the loop parameter Y4 is set to 0. Then, the method proceeds to step 532, the products obtained by the MR multipliers in the current clock cycle are added to the original second convolution result RSTB(m) by the row-output accumulator ACR(m) to obtain an updated second convolution result RSTB(m), wherein m is a positive integer between 1 and MC. Then, the method proceeds to 534, 1 is added to the loop parameter Y4. Then, the method proceeds to step 536, whether the loop parameter Y4 is equivalent to the quotient of the input data channel IC divided by the number of multipliers per row MR is determined. When the determination is Yes, then the method proceeds to step 538; when the determination is No, then the method returns to step 532. In step 538, 1 is added to the loop parameter Y3. After that, the method proceeds to 540, whether the loop parameter Y3 is equivalent to the product of the convolution kernel width KW and the convolution kernel height KH is determined. When the determination is Yes, then the method proceeds to step 542; when the determination is No, then the method returns to step 530. In step 542, 1 is added to the loop parameter Y2. Then, the method proceeds to step 544, whether the loop parameter Y2 is equivalent to the product of the convolution output width OW and the convolution output height OH is determined. When the determination is Yes, then the method proceeds to step 546; when the determination is No, then the method returns to step 528. In step 546, 1 is added to the loop parameter Y1. Then, the method proceeds to step 548, whether the loop parameter Y1 is equivalent to the quotient of the convolution output channel OC divided by the number of multipliers per column MC is determined. When the determination is Yes, then the method terminates; when the determination is No, then the method returns to step 526.

In an embodiment, for the depth-wise operation mode, steps 502~520 have 3 loops. The 3 loops arranged from inside out respectively are the $1^{st}$ loop, the $2^{nd}$ loop and the $3^{rd}$ loop. The $1^{st}$ loop, including steps 508-512, relates to the loop parameter X3. The $2^{nd}$ loop, including steps 506-516, relates to the loop parameter X2. The $3^{rd}$ loop, including steps 504-520, relates to the loop parameter X1. Step 508 is performed in each of the 3 loops. In step 508, the product obtained by a corresponding bidirectional multiplier P2(i) in the current clock cycle is added to the original first convolution result RSTA(i) by the column-output accumulator ACC(i) to obtain an updated first convolution result RSTA(i), wherein i is a positive integer between 1 and MR. The updated first convolution result RSTA(i) is obtained as follows: the column-output accumulator ACC(i) firstly uses the sub-product obtained by the corresponding bidirectional multiplier P2(i) in the first clock cycle as an original first convolution result RSTA(i), then adds up the sub-product obtained by the corresponding bidirectional multiplier P2(i) in each clock cycle to the original first convolution result RSTA(i) to obtain an updated first convolution result RSTA(i).

The criteria for stopping the 3 loops respectively are: (1) in step 512, when the loop parameter X3=(convolution kernel height KH)×(convolution kernel width KW), that is, after the $1^{st}$ loop is repeated for (KH×KW) times, the method stops the $1^{st}$ loop; (2) in step 516, when the loop parameter X2=(convolution output width OW)×(convolution output height OH), that is, after the $2^{nd}$ loop is repeated for (OW×OH) times, the method stops the $2^{nd}$ loop; and (3) in step 520, when the loop parameter X1=(convolution output channel OC)/(number of multipliers per row MR), that is, after the $3^{rd}$ loop is repeated for (OC/MR) times, the method stops the $3^{rd}$ loop.

In an embodiment, for the deep operation mode, steps 524~548 have 4 loops. The 4 loops arranged from inside out respectively are the $4^{th}$ loop, the $5^{th}$ loop, the $6^{th}$ loop and the $7^{th}$ loop. The $4^{th}$ loop, including steps 532-536, relates to the loop parameter Y4. The $5^{th}$ loop, including steps 530-540, relates to the loop parameter Y3. The $6^{th}$ loop, including steps 528-544, relates to the loop parameter Y2. The $7^{th}$ loop, including steps 526-548, relates to the loop parameter Y1. Step 532 is performed in each of the 4 loops. In step 532, the products obtained by the MR multipliers in the current clock cycle are added to the original second convolution result RSTB(m) by the row-output accumulator ACR(m) to obtain an updated second convolution result RSTB(m), wherein m is a positive integer between 1 and MC. The updated second convolution result is obtained as follows: the row-output accumulator ACR(m) firstly uses the sum obtained by adding up the MR sub-products obtained by the corresponding MR multiplier of the $m^{th}$ operation module in the first clock cycle as an original second convolution result RSTB(m), and then adds up the sum of MR sub-products obtained by the MR multipliers in each clock cycle to the original second convolution result RSTB(m) to obtain an updated second convolution result RSTB(m).

The criteria for stopping the 4 loops respectively are: (1) in step 536, when the loop parameter Y4=(the input data channel IC)/(the number of multipliers per row MR), that is, after the $4^{th}$ loop is repeated for (IC/MR) times, the method stops the $4^{th}$ loop; (2) in step 540, when the loop parameter Y3=(convolution kernel width KW)×(convolution kernel height KH), that is, after the $5^{th}$ loop is repeated for (KW×KH) times, the method stops the $5^{th}$ loop; (3) in step 544, when the loop parameter Y2=(convolution output width OW)×(convolution output height OH), that is, after the $6^{th}$ loop is repeated for (OW×OH) times, the method stops the $6^{th}$ loop; and (4) in step 548, when the loop parameter Y1=(convolution output channel OC)/(the number of multipliers per column MC), that is, after the $1^{st}$ loop is repeated for (OC/MC) times, the method stops the $7^{th}$ loop.

Figure 6A:
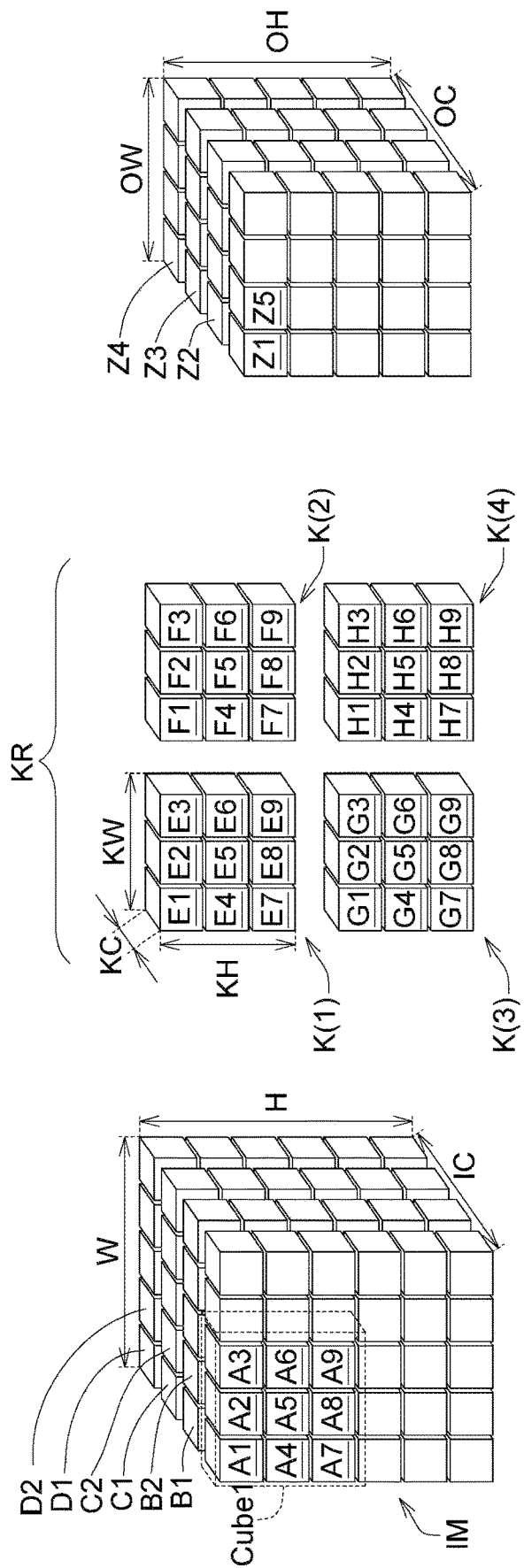
FIGS. 6A~6C are schematic diagrams of a depth-wise convolution operation according to an embodiment of the present disclosure.
Figure 6B:
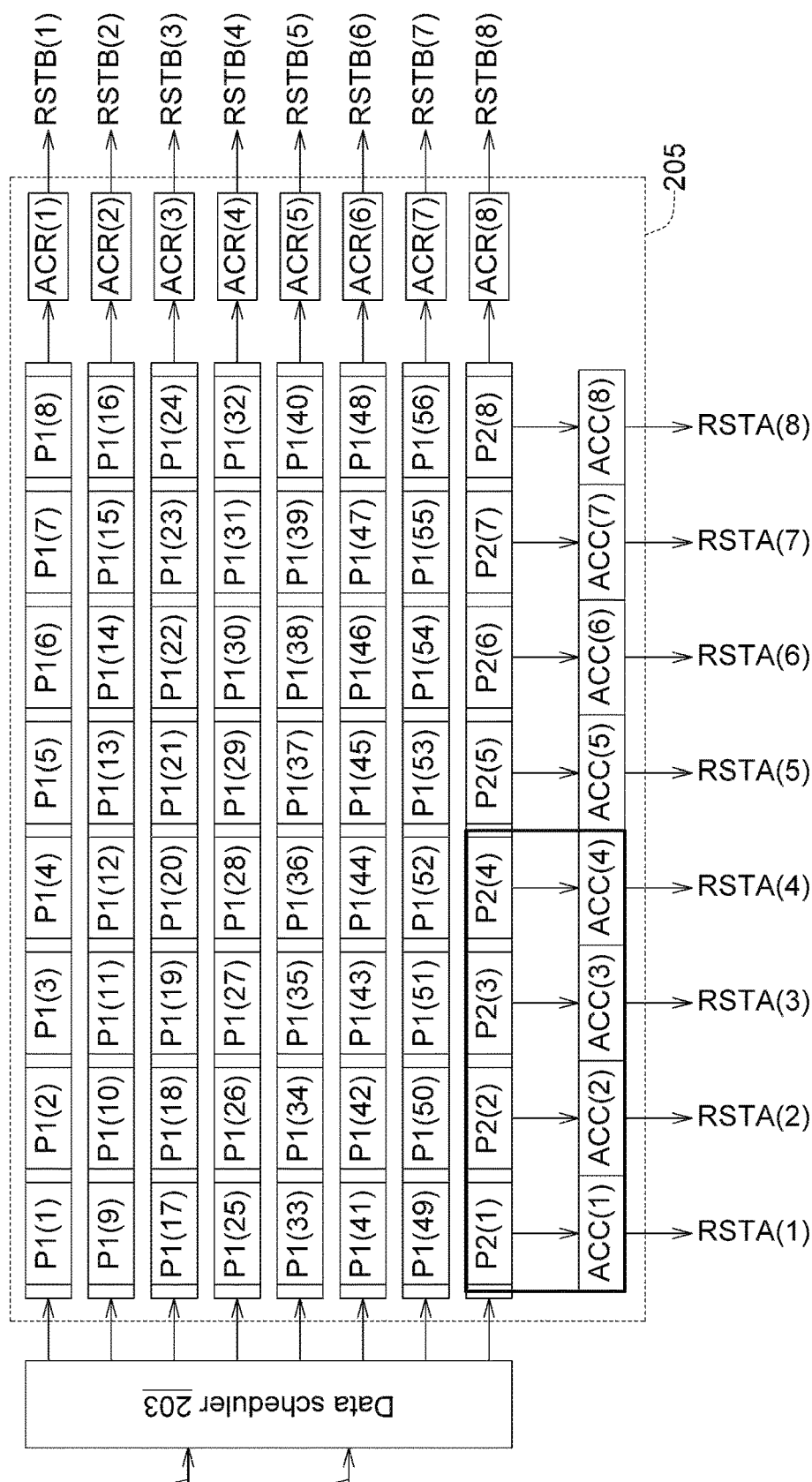

Referring to FIGS. 6A~6B, schematic diagrams of a depth-wise convolution operation according to an embodiment of the present disclosure are shown. FIG. 6A is a schematic diagram of an example of the convolutional neural-network calculating apparatus 200 of the present embodiment in the first operation mode, that is, a depth-wise convolution mode. FIG. 6A shows the three-dimensional size and the number of relevant operation data in a depth-wise (DW) convolutional neural-network operation. The height, the width and the channel of the input data IM respectively are represented by (input data width W)×(input data height H)×(input data channel IC), and are exemplified by W×H×IC=5×6×4 in the present embodiment. The width, the height and the channel of the 4 convolution kernels K(1)~K(4) respectively are represented by convolution kernel width KW)×(convolution kernel height KH)×(convolution kernel channel KC), and are exemplified by KW×KH×KC=3×3×1 in the present embodiment. The height, the width and the channel of the output convolution result respectively are represented by (convolution output width OW)×(convolution output height OH)×(convolution output channel OC), and are exemplified by OW×OH×OC=4×5×4 in the present embodiment. Since the convolution kernel channel KC of the depth-wise convolutional neural-network operation (=1) is less than the number of multipliers per row MR (=8), the convolutional neural-network calculating apparatus 200 is set to the first operation mode, that is, the depth-wise operation mode, and steps 502~520 are performed for convolution operation.

Refer to FIG. 6B. When the convolutional neural-network calculating apparatus 200 is set to the first operation mode, that is, the depth-wise operation mode, the data scheduler 203 allocates the convolution values of relevant convolution operation that will be performed by each convolution kernel to one of the bidirectional multiplier P2(i) of the bidirectional-output operation module 209 in the $8^{th}$ row to perform convolution operation with, wherein i is a positive integer between 1 and MR, and is outputted to the corresponding column-output accumulator ACC(i) and is accumulated by the corresponding column-output accumulator ACC(i) from the column-output port 27. In the example of FIG. 6A, only 4 convolution kernels are used in convolution operation, the circuits of the operation module array 205 that will be used in the depth-wise operation mode are illustrated in a bold frame of FIG. 6B. The bold frame includes the first 4 bidirectional multipliers P2(1)~P2(4) and the first 4 column-output accumulators ACC(1)~ACC(4). The unidirectional operation modules 207 in the $1^{st}$ row to the $7^{th}$ row of the operation module array 205 are not used and therefore could selectively enter a power saving mode to save power consumption.

In the $1^{st}$ loop of the flowchart of FIG. 5A with X3=0, that is, when the method is performed in the first clock cycle, the data scheduler 203 selects the first convolution value of the first position on the plane defined by the height KH and the width KW of each convolution kernel KR, selects a first data value corresponding to the first position on the plane defined by the height H and the width W of the input data IM, and outputs the first convolution value and the first data value to a bidirectional multiplier P2(i) which performs step 508 to obtain a $1^{st}$ sub-convolution operation result, wherein i is a positive integer between 1~MR.

FIGS. 6A~6B are an example in which the data scheduler 203 of the present embodiment outputs the first convolution value and the first data value to a bidirectional multiplier P2(i), but the present embodiment is not limited thereto. In the $1^{st}$ loop with X3=0, that is, when the method is performed in the first clock cycle, the data scheduler 203 is configured to: (a) allocate the data value A1 of the input data IM and the convolution value E1 of the first convolution kernel K(1) to the first bidirectional multiplier P2(1) in the $8^{th}$ row for performing convolution operation; (b) allocate the data value B1 of the input data IM and the convolution value F1 of the second convolution kernel K(2) to the second bidirectional multiplier P2(2) in the $8^{th}$ row for performing convolution operation; (c) allocate the data value C1 of the input data IM and the convolution values G1 of the third convolution kernel K(3) to the 3-rd bidirectional multiplier P2(3) in the $8^{th}$ row for performing convolution operation; and (d) allocate the data value D1 of the input data IM and the convolution values H1 of the $4^{th}$ convolution kernel K(4) to the $4^{th}$ bidirectional multiplier P2(4) in the $8^{th}$ row for performing convolution operation. In the end of the first clock cycle, the first 4 column-output accumulators ACC(1) ~ACC(4) respectively accumulate the $1^{st}$ sub-convolution operation result outputted by one of the 4 bidirectional multipliers P2(1)~P2(4) in the first clock cycle. For example, the initial value of the sum of the first column-output accumulator ACC(1) is 0, the first bidirectional multiplier P2(1) outputs the $1^{st}$ sub-convolution operation result in the first clock cycle, and the $1^{st}$ sub-convolution operation result is added to the initial value of the sum of the first column-output accumulator ACC(1). Thus, in the end of the first clock cycle, an original first convolution result RSTA(1) temporarily stored in the first column-output accumulator ACC(1) is equivalent to the $1^{st}$ sub-convolution operation result. By the same analogy, the initial value of the sum of the $4^{th}$ column-output accumulator ACC(4) is 0, the $4^{th}$ bidirectional multiplier P2(4) outputs another sub-convolution operation result in the first clock cycle, and the another sub-convolution operation result is added to the initial value of the sum of the $4^{th}$ column-output accumulator ACC(4). Thus, in the end of the first clock cycle, the original first convolution result RSTA(4) temporarily stored in the $4^{th}$ column-output accumulator ACC(4) is equivalent to the another sub-convolution operation result.

When X3=1 and the $1^{st}$ loop of the flowchart of FIG. 5A is performed for the second time, that is, when the method is performed in the second clock cycle, the data scheduler 203 selects a second convolution value of a second position on the plane defined by the height KH and the width KW of the convolution kernels, selects a second data value corresponding to the second position on the plane defined by the height H and the width W of the input data IM, and outputs the second convolution value and the second data value to the $i^{th}$ bidirectional multiplier P2(i) to obtain the $2^{nd}$ sub-convolution operation result. The second position is different from the first position and is obtained by shifting the first position by q strides, wherein q is a positive integer. For example, the second position is obtained by shifting the first position by 1 stride or 2 strides, but the disclosure is no limited thereto.

As indicated in FIG. 6A~6B, in the $2^{nd}$ loop with X3=1, that is, when the method is performed in the second clock cycle, the data scheduler 203 is configured to: (a) allocate the data value A2 of the input data IM and the convolution value E2 of the first convolution kernel K(1) to the first bidirectional multiplier P2(1) in the $8^{th}$ row for performing convolution operation; (b) allocate the data value B2 of the input data IM and the convolution value F2 of the second convolution kernel K(2) to the second bidirectional multiplier P2(2) in the $8^{th}$ row for performing convolution operation; (c) allocate the data value C2 of the input data IM and the convolution values G2 of the third convolution kernel K(3) to the 3-rd bidirectional multiplier P2(3) in the $8^{th}$ row for performing convolution operation; (d) allocate the data value D2 of the input data IM and the convolution values H2 of the $4^{th}$ convolution kernel K(4) to the $4^{th}$ bidirectional multiplier P2(4) in the $8^{th}$ row for performing convolution operation. In the end of the second clock cycle, the first 4 column-output accumulators ACC(1)~ACC(4) respectively accumulate the $2^{nd}$ sub-convolution operation result outputted by one of the 4 bidirectional multipliers P2(1)~P2(4) in the second clock cycle. For example, in the end of the first clock cycle, the original first convolution result RSTA(1) temporarily stored in the first column-output accumulator ACC(1) is equivalent to the $1^{st}$ sub-convolution operation result, and the first bidirectional multiplier P2(1) outputs the $2^{nd}$ sub-convolution operation result in the second clock cycle, and the first column-output accumulator ACC(1) adds the $2^{nd}$ sub-convolution operation result to the original first convolution result RSTA(1). Thus, in the end of the second clock cycle, the first column-output accumulator ACC(1) stores an updated first convolution result RSTA(1), which is equivalent to the sum of the $1^{st}$ sub-convolution operation result and the $2^{nd}$ sub-convolution operation result. By the same analogy, in the end of the first clock cycle, the original first convolution result RSTA(4) temporarily stored in the $4^{th}$ column-output accumulator ACC(4) is equivalent to another sub-convolution operation result, and the $4^{th}$ bidirectional multiplier P2(4) outputs an alternate sub-convolution operation result in the second clock cycle, the $4^{th}$ column-output accumulator ACC(4) adds the alternate sub-convolution operation result to the original first convolution result RSTA(4). Thus, in the end of the second clock cycle, the $4^{th}$ column-output accumulator ACC(4) stores an updated first convolution result RSTA(4), which is equivalent to the sum of the original first convolution result RSTA(4) and the alternate sub-convolution operation result.

As indicated in FIG. 6A, the width and the height of the 4 convolution kernels K(1)~K(4) respectively are (width KW)×(height KH)=3×3, therefore each convolution kernel has 9 convolution values. After 9 clock cycles of operation, (a) the first column-output accumulator ACC(1) stores the sum of 9 sub-convolution operation results of the convolution values E1~E9 of the first convolution kernel K(1) and the data values A1~A9 of corresponding positions; meanwhile, the column-output accumulator ACC(1) outputs the convolution operation result at a convolution output point Z1; (b) the second column-output accumulators ACC(2) stores the sum of 9 sub-convolution operation results of the convolution values F1~F9 of the second convolution kernel K(2) and the data values A1~A9 of corresponding positions; meanwhile the column-output accumulators ACC(2) outputs the convolution operation result at a convolution output point Z2; (c) the 3-rd column-output accumulators ACC(3) stores the sum of 9 sub-convolution operation results of the convolution values G1~G9 of the third convolution kernel K(3) and the data values A1~A9 of corresponding positions; meanwhile, the column-output accumulators ACC(3) outputs the convolution operation result at a convolution output point Z3; (d) the $4^{th}$ column-output accumulator ACC(4) stores the sum of 9 sub-convolution operation results of the convolution values H1~H9 of the $4^{th}$ convolution kernel K(4) and the data values A1~A9 of corresponding positions. Meanwhile, the column-output accumulator ACC(4) outputs the convolution operation result at a convolution output point Z4. Since the $1^{st}$ loop has been performed for (convolution kernel width KW)×(convolution kernel height KH) times, and the criterion that X3=(convolution kernel width KW)×(convolution kernel height KH) as indicated in step 512 is satisfied, the method stops the $1^{st}$ loop.

Figure 6C:
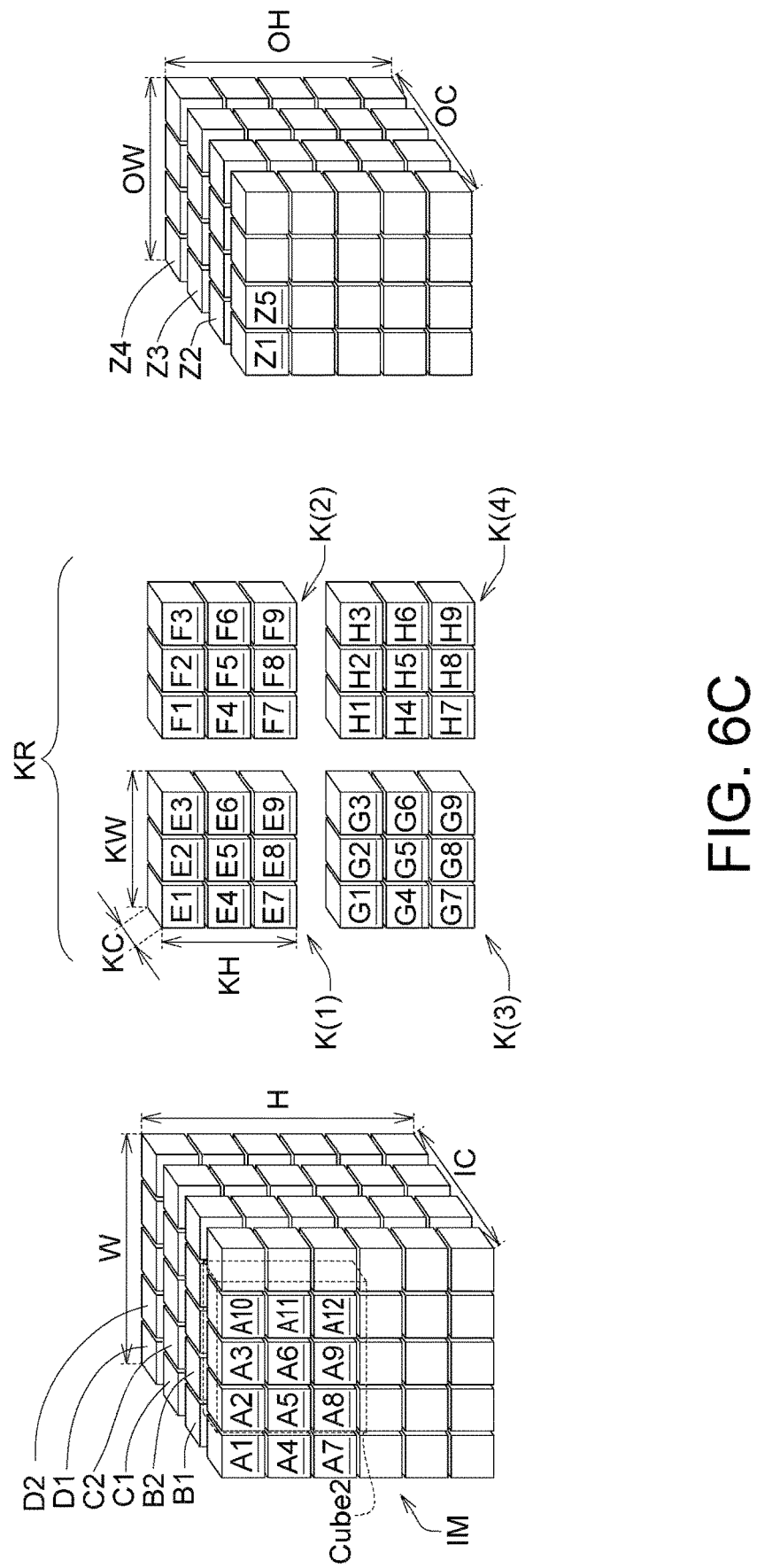

In the $2^{nd}$ loop, convolution operation is performed to the convolution output result at different positions. For example, in FIG. 6A, the convolution output width OW and the convolution output height OH of the convolution output result are 4×5, that is, there are 20 convolution output points in total. As indicated in FIG. 6A, when the $2^{nd}$ loop is performed for the first time, convolution operation is performed to the first data value cube cube1 of the input data IM and the first convolution kernel K(1) to obtain a first convolution output point Z1, wherein the first data value cube cube1 includes data values A1~A9. As indicated in FIG. 6C, when the $2^{nd}$ loop is performed for the second time, convolution operation is performed to the second data value cube cube2 of the input data IM and the first convolution kernel K(1) to obtain a $5^{th}$ convolution output point Z5, wherein the second data value cube cube2 includes data values A2~A3, A5~A6, A8~A9, A10~A12. Each time when the $2^{nd}$ loop is performed, the data scheduler 203 shifts the 3×3 data value cubes rightward or downward by 1 stride, selects 3×3 data value cubes from different positions of the input data IM to perform convolution operation with the first convolution kernel K(1) to obtain a convolution output point. When the $2^{nd}$ loop is performed for (convolution output width OW)×(convolution output height OH) times, that is, the $2^{nd}$ loop is repeated for 4×5=20 times, the data scheduler 203 has already selected 3×3 data value cubes from 20 different positions to complete the 20 convolution output points, and the criterion that X2=(convolution output width OW)×(convolution output height OH) as indicated in step 516 is satisfied, therefore the method stops the $2^{nd}$ loop.

Figure 7A:
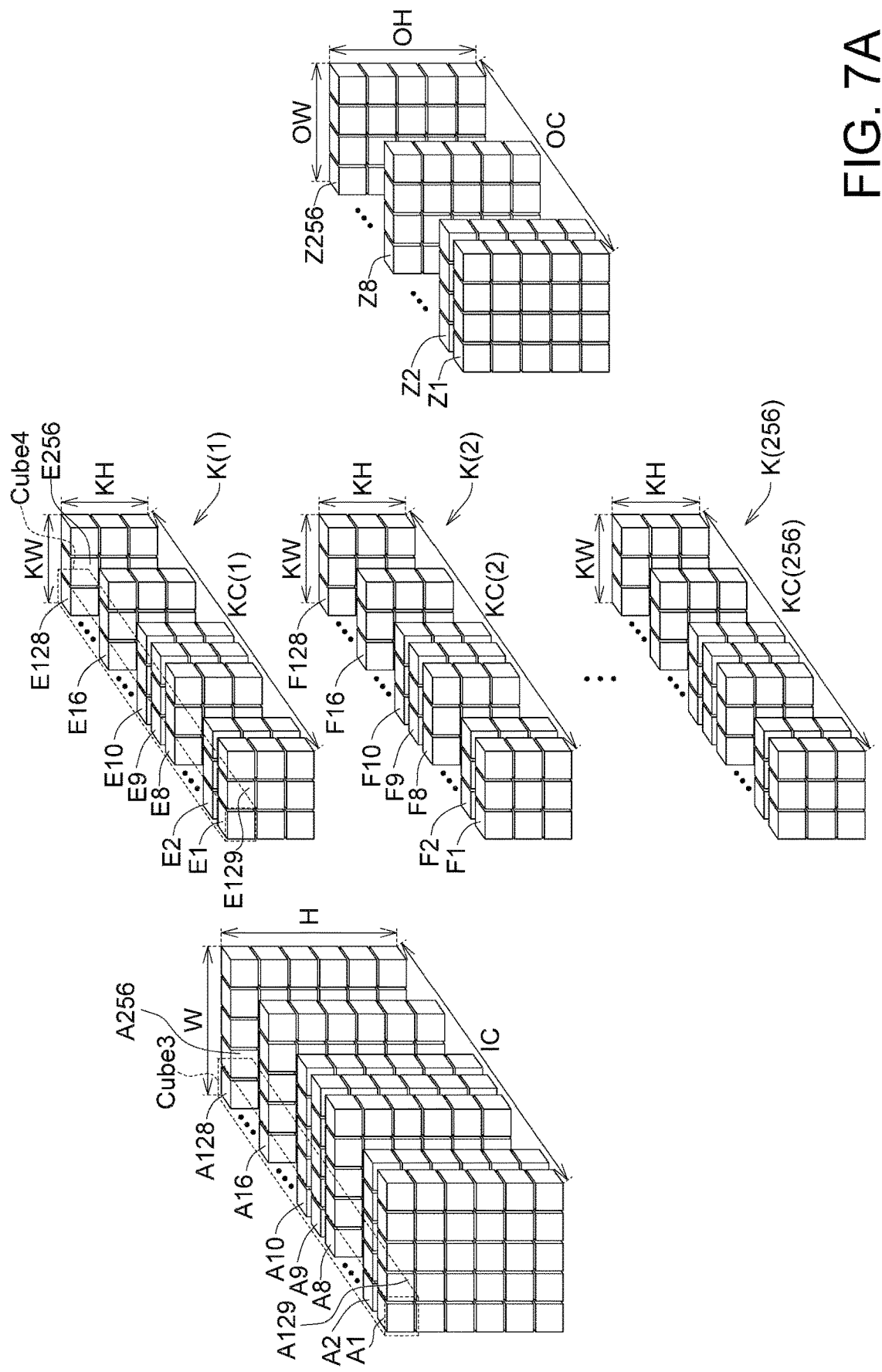
FIGS. 7A~7E are schematic diagrams of a deep convolution operation according to an embodiment of the present disclosure.

In the $3^{rd}$ loop, convolution operation is performed to different convolution kernels. In FIG. 7A, the convolution output channel OC is 4, the number of multipliers per row MR is 8, therefore the quotient of the convolution output channel OC divided by the number of multipliers per row MR is less than or equivalent to 1, that is, the $3^{rd}$ loop only needs to be performed once. Thus, the $1^{st}$ loop is repeated for 9 times, the $2^{nd}$ loop is repeated for 4×5=20 times, and the $3^{rd}$ loop is repeated once, and there are 9×20×1=180 loops that need to be performed. That is, after the operation of the convolutional neural-network calculating apparatus 200 of the present embodiment is operated for 180 clock cycles, the depth-wise convolution operation of FIG. 6A could be completed.

FIGS. 7A~7E are schematic diagrams of a deep convolution operation according to an embodiment of the present disclosure. Referring to FIG. 7A, a schematic diagram of a second operation mode, that is, a deep convolution, performed by the convolutional neural-network calculating apparatus 200 of the present embodiment is shown. FIG. 7A illustrates the three-dimensional size and the number of relevant data used in a conventional deep convolutional neural-network operation. The height, the width and the channel of the input data IM are represented as (input data width W)×(input data height H)×(input data channel IC), such as 5×6×128. The height, the width and the channel of the 256 convolution kernels are represented as (convolution kernel width KW)×(convolution kernel height KH)×(convolution kernel channel KC), such as 3×3×128. The 256 convolution kernels include a first convolution kernel K(1), a second convolution kernel K(2) . . . and a $256^{th}$ convolution kernel K(256). The first convolution kernel K(1) has a convolution kernel channel KC(1), and the second convolution kernel K(2) has a convolution kernel channel KC(2).

The height, the width and the channel of the output convolution result are represented as (convolution output width OW)×(convolution output height OH)×(convolution output channel OC), such as 4×5×256. Since convolution kernel channel KC(=128) is greater than the number of multipliers per row MR (=8), the convolutional neural-network calculating apparatus 200 is set to the second operation mode, that is, a deep operation mode, and steps 524~548 of FIG. 5B are performed for convolution operation.

Figure 7B:
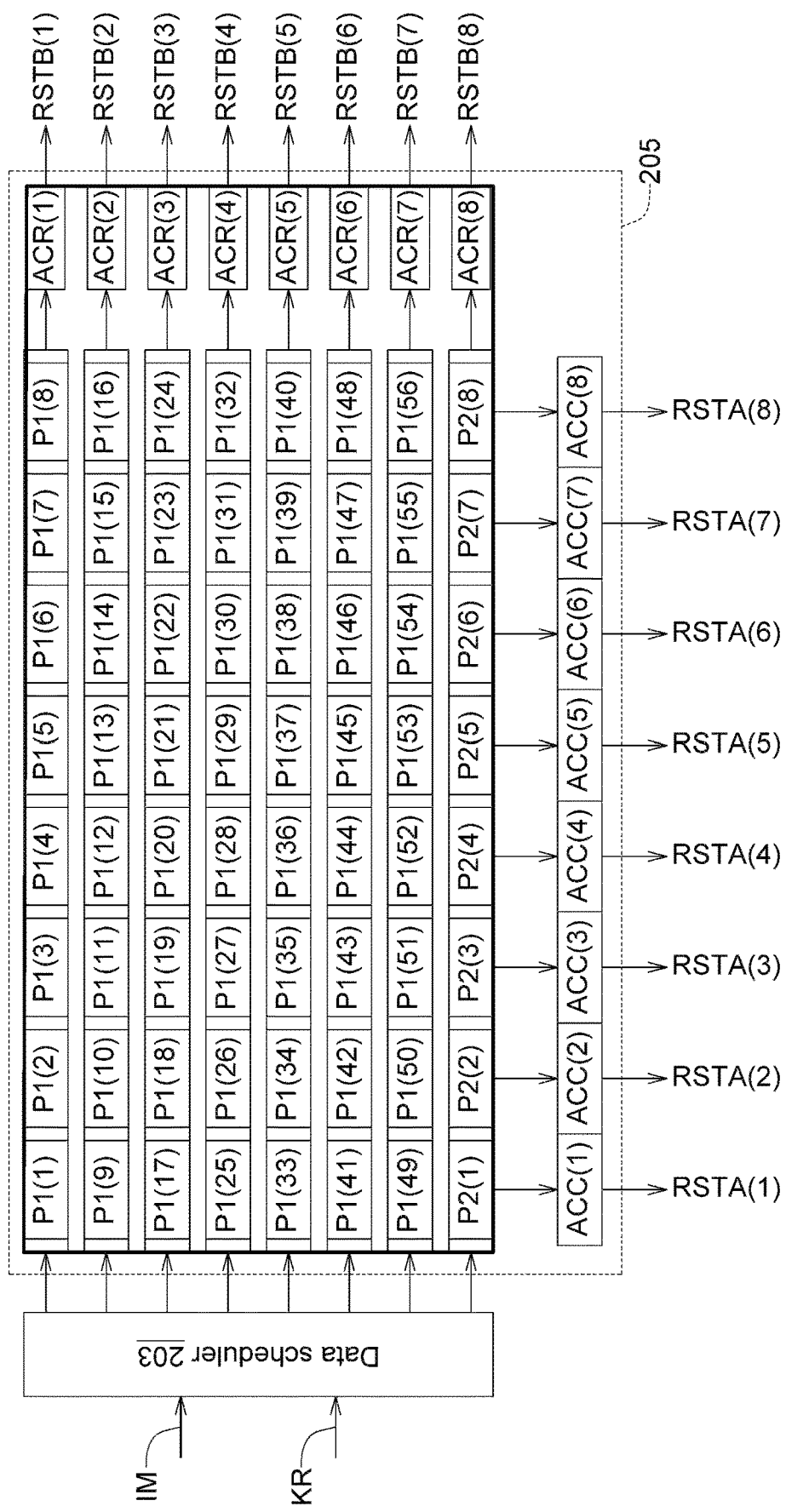

Referring to FIG. 7B, when the convolutional neural-network calculating apparatus 200 is set to a second operation mode, that is, a deep operation mode, the circuits of the operation module array 205 that will be used in the deep operation mode are illustrated in a bold frame of FIG. 7B, and all the 64 multipliers of the 8 operation modules (including 56 unidirectional multipliers P1(1)~P1(56) and 8 bidirectional multipliers P2(1)~P2(8)) and the row-output accumulators ACR(1)~ACR(8) participate in the convolution operation, and the operation results are outputted to one of the corresponding row-output accumulators ACR(1) ~ACR(8) from respectively row-output ports 25 of the 64 multipliers (including 56 unidirectional multipliers P1(1) ~P1(56) and 8 bidirectional multipliers P2(1)~P2(8)). The row-output accumulator ACR(m) firstly adds up the products obtained by the 8 multipliers in a first clock cycle to obtain an original second convolution result RSTB(8), wherein m is a positive integer between 1 and MC. Then, the row-output accumulator ACR(m) adds up the products obtained by the 8 multipliers in a second clock cycle 8 to the original second convolution result RSTB(m) to obtain an updated second convolution result RSTB(m).

The following descriptions are exemplified by the first bidirectional-output operation module 207, but the present embodiment is not limited thereto. When the convolutional neural-network calculating apparatus 200 is set to the second operation mode, the 8 unidirectional multipliers P1(1)~P1 (8) output the operation results through their respective row-output ports 25. For example, the first unidirectional multiplier P1(1) outputs the $1^{st}$ sub-convolution operation result O1(1) in the first clock cycle, and outputs the $2^{nd}$ sub-convolution operation result O1(2) in the second clock cycle. The second bidirectional multiplier P1(2) outputs the $3^{rd}$ sub-convolution operation result O1(3) in the first clock cycle, and outputs the $4^{th}$ sub-convolution operation result O1(4) in the second clock cycle. By the same analogy, the $8^{th}$ bidirectional multiplier P1(8) outputs the $15^{th}$ sub-convolution operation result O1(15) in the first clock cycle, and outputs the $16^{th}$ sub-convolution operation result O1(16) in the second clock cycle. In the end of the first clock cycle, the row-output accumulator ACR(1) firstly adds up 8 sub-convolution operation results including the $1^{st}$ sub-convolution operation result O1(1), the $3^{rd}$ sub-convolution operation result O1(3) . . . and the $15^{th}$ sub-convolution operation result O1(15) to obtain an original second convolution result RSTB(1). In the end of the second clock cycle, the row-output accumulator ACR(1) again adds up the 8 sub-convolution operation results including the $2^{nd}$ sub-convolution operation result O1(2), the $4^{th}$ sub-convolution operation result O1(4) . . . and the $16^{th}$ sub-convolution operation result O1(16) to the original second convolution result RSTB(1) to obtain an updated second convolution result RSTB(1).

Detailed operations of the $1^{st}$ unidirectional operation module 207 are disclosed below. As indicated in FIGS. 7A~7B, when Y4=0, the $4^{th}$ loop of the flowchart of FIG. 5B is performed for the first time, that is, when the method is performed in the first clock cycle, the data scheduler 203 is configured to: (a) select a first position along the direction of the channel KC(1) of the first convolution kernel K(1), obtain a first convolution value of the first position E1, select a first data value corresponding to the first position A1 along the direction of the channel IC of the input data IM, and transmit the first convolution value E1 and the first data value A1 to the first unidirectional multiplier P1(1) to obtain the $1^{st}$ sub-convolution operation result O1(1); (b) select a second position along the direction of the channel KC(1) of the first convolution kernel K(1), obtain a second convolution value E2 of the second position, select a second data value A2 corresponding to the second position along the direction of the channel IC of the input data IM, and transmit the second convolution value E2 and the second data value A2 to the second unidirectional multiplier P1(2) to obtain the $3^{rd}$ sub-convolution operation result O1(3); (c) by the same analogy, select an $8^{th}$ position along the direction of the channel KC(1) of the first convolution kernel K(1), obtain an $8^{th}$ convolution value E8 of the $8^{th}$ position, select an $8^{th}$ data value A8 corresponding to the $8^{th}$ position along the direction of the channel IC of the input data IM, and transmit the $8^{th}$ convolution value E8 and the $8^{th}$ data value A8 to the $8^{th}$ unidirectional multiplier P1(8) to obtain the $15^{th}$ sub-convolution operation result O1(15). Thus, in the first clock cycle, the data scheduler 203 selects 8 positions along the direction of the channel KC(1) of the first convolution kernel K(1) to obtain 8 convolution values E1~E8, and at the same time obtains 8 data values A1~A8 of the corresponding positions of the input data IM, and transmits the 8 convolution values E1~E8 and the 8 data values A1~A8 to the 8 corresponding unidirectional multipliers P1(1)~P1(8) for performing convolution operation to obtain 8 sub-convolution operation results O1(1), O1(3) . . . O1(15). Then, the operation results are respectively outputted to the row-output accumulator ACR(1) through respective row-output ports 25 of the 8 corresponding unidirectional multipliers P1(1)~P1(8). In the end of the first clock cycle, the row-output accumulator ACR(1) adds up the 8 sub-convolution operation results O1(1), O1(3) . . . O1(15) to obtain an original second convolution result RSTB(1).

When Y4=1, the $4^{th}$ loop of the flowchart of FIG. 5B is performed for the second time, that is, when the method is performed in the second clock cycle, the data scheduler 203 is configured to: (a) select a $9^{th}$ position along the direction of the channel KC(1) of the first convolution kernel K(1), obtain a $9^{th}$ convolution value E9 of the $9^{th}$ position, select a $9^{th}$ data value A9 corresponding to the $9^{th}$ position along the direction of the channel IC of the input data IM, and transmit the $9^{th}$ convolution value E9 and the $9^{th}$ data value A9 to the first unidirectional multiplier P1(1) to obtain the $2^{nd}$ sub-convolution operation result O1(2); (b) select a $10^{th}$ position along the direction of the channel KC(1) of the first convolution kernel K(1), obtain a $10^{th}$ convolution value E10 of the $10^{th}$ position, select a $10^{th}$ data value A10 corresponding to the $10^{th}$ position along the direction of the channel IC of the input data IM, and transmit the $10^{th}$ convolution value E10 and the $10^{th}$ data value A10 to the second unidirectional multiplier P1(2) to obtain the $4^{th}$ sub-convolution operation result O1(4); (c) by the same analogy, select a $16^{th}$ position along the direction of the channel KC(1) of the first convolution kernel K(1), obtain a $16^{th}$ convolution value E16 of the $16^{th}$ position, select a $16^{th}$ data value A16 corresponding to the $16^{th}$ position along the direction of the channel IC of the input data IM, and transmit the $16^{th}$ convolution value E16 and the $16^{th}$ data value A16 to the $8^{th}$ unidirectional multiplier P1(8) to obtain the $16^{th}$ sub-convolution operation result O1(16). In the second clock cycle, the data scheduler 203 selects 8 positions along the direction of the channel KC(1) of the first convolution kernel K(1), obtains 8 convolution values E9~E16 and 8 data value A9~A16 of the corresponding positions of the input data IM, and transmits the 8 convolution values E9~E16 and the 8 data value A9~A16 of the corresponding positions of the input data IM to the 8 unidirectional multipliers P1(1)~P1(8) for performing convolution operation to obtain 8 sub-convolution operation results O1(2), O1(4) . . . O1(16) in the second clock cycle. Then, the 8 sub-convolution operation results O1(2), O1(4) . . . O1(16) are outputted to the row-output accumulator ACR(1) through respective row-output ports 25 of the 8 corresponding unidirectional multipliers P1(1)~P1(8). In the end of the second clock cycle, the row-output accumulator ACR(1) adds up the 8 sub-convolution operation results O1(2), O1(4) . . . O1(16) to an original second convolution result RSTB(1) obtained in the first clock cycle to obtain an updated second convolution result RSTB(1).

Refer to FIGS. 7A~7B. The operations of other operation module arrays (the $2^{nd}$ to the $7^{th}$ unidirectional operation module 207, the $8^{th}$ bidirectional-output operation module 17) of the operation module array 205 are the same as the operations of the $1^{st}$ unidirectional operation module 207 but correspond to different convolution kernels. For example, the operation of the $2^{nd}$ unidirectional operation module 207 is as follows: in the first clock cycle, the data scheduler 203 is configured to (a) select a first position along the direction of the channel KC(2) of the second convolution kernel K(2), obtain a first convolution value of a first position F1, select a first data value A1 corresponding to the first position along the direction of the channel IC of the input data IM, and transmit the first convolution value F1 and the first data value A1 to the $9^{th}$ unidirectional multiplier P1(9) to obtain the $1^{st}$ sub-convolution operation result O2(1); (b) select a second position along the direction of the channel KC(2) of the second convolution kernel K(2), obtain a second convolution value F2 of the second position, and select the second data value A2 corresponding to the second position along the direction of the channel IC of the input data IM, and transmit the second convolution value F2 and the second data value A2 to the $10^{th}$ unidirectional multiplier P1(10) to obtain the $3^{rd}$ sub-convolution operation result O2(3); (c) by the same analogy, select an $8^{th}$ position along the direction of the channel KC(2) of the second convolution kernel K(2), obtain an $8^{th}$ convolution value F8 of the $8^{th}$ position, and select the $8^{th}$ data value A8 corresponding to the $8^{th}$ position along the direction of the channel IC of the input data IM, and transmit the $8^{th}$ convolution value E8 and the $8^{th}$ data value A8 to the $16^{th}$ unidirectional multiplier P1(16) to obtain the $15^{th}$ sub-convolution operation result O2(15). Thus, in the first clock cycle, the data scheduler 203 selects 8 positions along the direction of the channel KC(2) of the second convolution kernel K(2), obtains 8 convolution values F1~F8 and 8 data values A1~A8 of the corresponding positions of the input data IM, and transmit the 8 convolution values F1~F8 and the 8 data values A1~A8 to the 8 unidirectional multipliers P1(9)~P1(16) for performing convolution operation to obtain 8 sub-convolution operation results O2(1), O2(3) . . . O2(15). Then, the 8 sub-convolution operation results O2(1), O2(3) . . . O2(15) are outputted to the row-output accumulator ACR(2) through respective row-output ports 25. In the end of the first clock cycle, the row-output accumulator ACR(2) adds up the 8 sub-convolution operation results O2(1), O2(3) . . . O2(15) to obtain an original second convolution result RSTB(2).

When Y4=1, the $4^{th}$ loop of the flowchart of FIG. 5B is performed for the second time, that is, when the method is performed in the second clock cycle, the data scheduler 203 is configured to: (a) select a $9^{th}$ position along the direction of the channel KC(2) of the second convolution kernel K(2), obtain a $9^{th}$ convolution value F9 of the $9^{th}$ position, select a $9^{th}$ data value A9 corresponding to the $9^{th}$ position along the direction of the channel IC of the input data IM, and transmit the $9^{th}$ convolution value E9 and the $9^{th}$ data value A9 to the $9^{th}$ unidirectional multiplier P1(9) to obtain the $2^{nd}$ sub-convolution operation result O2(2); (b) select a $10^{th}$ position along the direction of the channel KC(2) of the second convolution kernel K(2), obtain a $10^{th}$ convolution value F10 of the $10^{th}$ position, select a $10^{th}$ data value A10 corresponding to the $10^{th}$ position along the direction of the channel IC of the input data IM, and transmit the $10^{th}$ convolution value E10 and the $10^{th}$ data value A10 to the $10^{th}$ unidirectional multiplier P1(10) to obtain the $4^{th}$ sub-convolution operation result O2(4); (c) by the same analogy, select a $16^{th}$ position along the direction of the channel KC(2) of the second convolution kernel K(2), obtain a $16^{th}$ convolution value F16 of the $16^{th}$ position, select a $16^{th}$ data value A16 corresponding to the $16^{th}$ position along the direction of the channel IC of the input data IM, and transmit the $16^{th}$ convolution value F16 and the $16^{th}$ data value A16 to the $16^{th}$ unidirectional multiplier P1(16) to obtain the $16^{th}$ sub-convolution operation result O2(16). In the second clock cycle, the data scheduler 203 selects 8 positions along the direction of the channel KC(2) of the second convolution kernel K(2), obtains 8 convolution values F9~F16 and 8 data value A9~A16 of the corresponding positions of the input data IM, and transmits the 8 convolution values F9~F16 and the 8 data value A9~A16 of the corresponding positions of the input data IM to the 8 unidirectional multipliers P1(9)~P1(16) for performing convolution operation to obtain 8 sub-convolution operation results O2(2), O2(4) . . . O2(16) in the second clock cycle. Then, the 8 sub-convolution operation results O2(2), O2(4) . . . O2(16) are outputted to the row-output accumulator ACR(2) through respective row-output ports 25. In the end of the second clock cycle, the row-output accumulator ACR(2) adds up the 8 sub-convolution operation results O2(2), O2(4) . . . O2(16) to an original second convolution result RSTB(2) obtained in the first clock cycle to obtain an updated second convolution result RSTB(2).

Refer to FIG. 7A. The convolution kernel channel KC of the 256 convolution kernels K(1)~K(256) is 128, and each time the $4^{th}$ loop could perform at most MR convolution operations, wherein MR represents the number of multipliers per row. In the present embodiment, each time the $4^{th}$ loop could perform at most 8 convolution operations. After the $4^{th}$ loop is performed for (IC/MR)=(128/8)=16 times (IC represents the input data depth), that is, after the $4^{th}$ loop is performed for 16 times, (a) the first row-output accumulator ACR(1) stores the sum of 128 sub-convolution operation results of the convolution values E1~E128 of the first convolution kernel K(1) and the data values A1~A128 of corresponding positions; meanwhile, the row-output accumulator ACR(1) obtains a temporary value of the output accumulator ACR(1); (b) the second row-output accumulator ACR(2) stores the sum of 128 sub-convolution operation results of the convolution values F1~F128 of the second convolution kernel K(2) and the data values A1~A128 of corresponding positions; meanwhile, the row-output accumulator ACR(2) obtain a temporary value of the output accumulator ACR(2); (c) by the same analogy, the $8^{th}$ row-output accumulator ACR(8) stores the sum of 128 sub-convolution operation results of the 128 convolution values of the $8^{th}$ convolution kernel K(8) on the direction of the channel KC(8) and the data values A1~A128 of corresponding positions; meanwhile, the row-output accumulator ACR(8) obtains a temporary value of the output accumulator ACR(2). Since the $4^{th}$ loop is already repeated for 16 times and the criterion that Y4=(IC/MR)=(128/8)=16 as indicated in step 536 is satisfied, the method stops the $4^{th}$ loop.

Figure 7C:
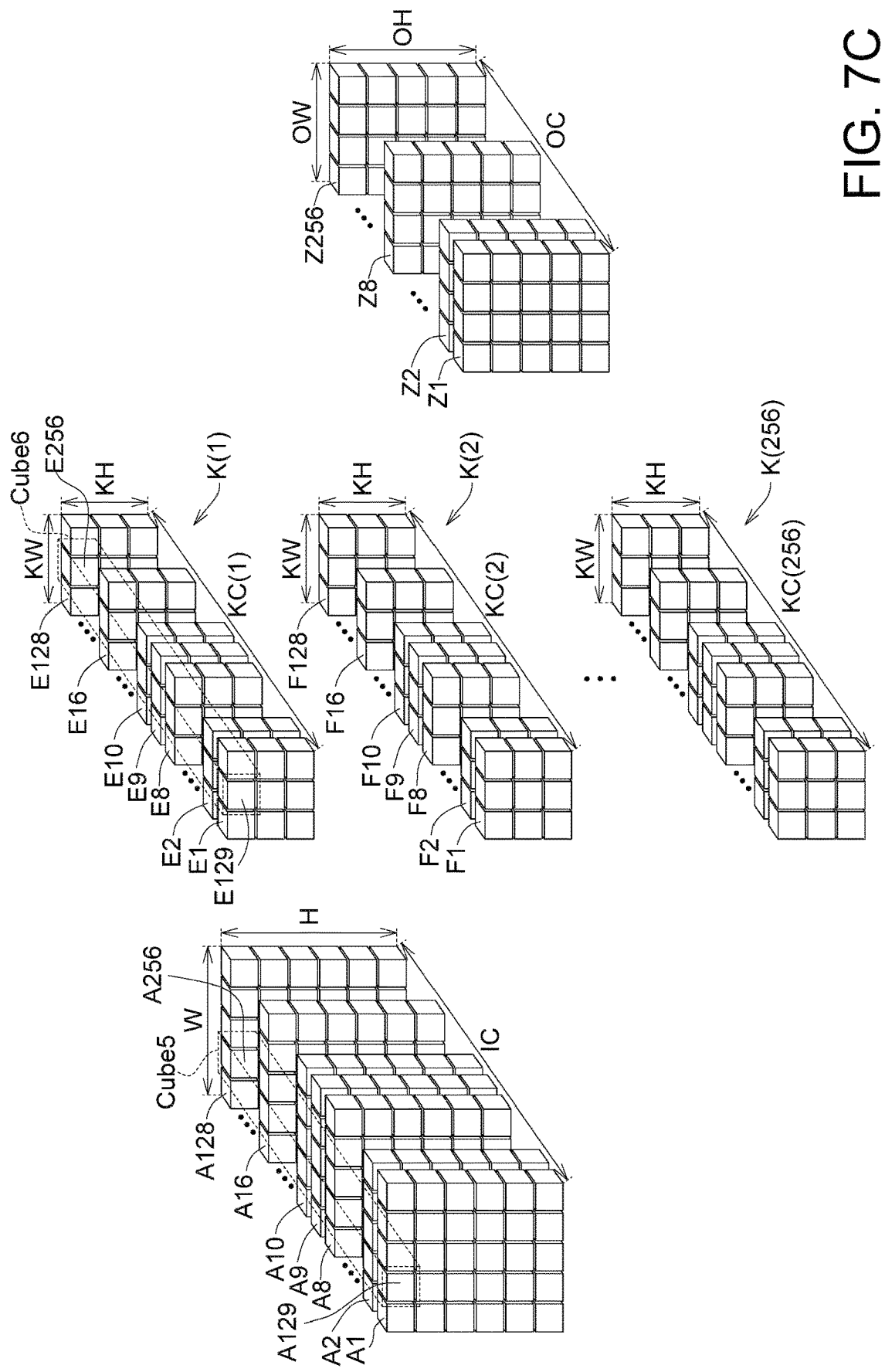

In the $5^{th}$ loop, all convolution operations on the plane defined by each convolution kernel height KH and width KW are completed. As indicated in FIG. 7A, when the $5^{th}$ loop is performed for the first time, convolution operation is performed to the third data value cube cube3 of the input data IM and the $4^{th}$ convolution value cube cube4 of the first convolution kernel K(1). The third data value cube cube3 includes data values A1~A128, the $4^{th}$ convolution value cube cube4 includes convolution values E1~E128, and the row-output accumulator ACR(m) obtains a temporary value of the output accumulator ACR(m). As indicated in FIG. 7C, when the $5^{th}$ loop is performed for the second time, the data scheduler 203 shifts the two 1×128 cubes cube3 and cube4 rightward by 1 stride to obtain two cubes cube5 and cube6 (shown in FIG. 7C) (the data scheduler 203 could shift the two 1×128 cubes cube3 and cube4 rightward by 2 strides or 3 strides, but the present disclosure is not limited thereto), and convolution operation is performed to the $5^{th}$ data value cube cube5 of the input data IM and the $6^{th}$ convolution value cube cube6 of the first convolution kernel K(1). The $5^{th}$ data value cube cube5 includes data values A129~A256, the $6^{th}$ convolution value cube cube6 includes convolution values E129~E256, and the row-output accumulator ACR (m) adds up the convolution operation result, obtained when the $5^{th}$ loop is performed for the second time, to the temporary value of the output accumulator ACR(m) to obtain an updated temporary value of the output accumulator ACR (m). By the same analogy, each time when the $5^{th}$ loop is performed, the data scheduler 203 shifts the two 1×128 cubes rightward or downward by 1 stride and selects a 1×128 data value cube from different positions of the input data IM and a 1×128 convolution value cube from different positions of the first convolution kernel K(1) for performing convolution operation, and the row-output accumulator ACR(m) adds up the convolution operation result, obtained each time when the $5^{th}$ loop is performed, to the temporary value of the output accumulator ACR(m) to obtain an updated temporary value of the output accumulator ACR (m). The width and the height of each convolution kernel respectively are such as (width KW)×(height KH)=3×3. When the loop parameter Y3=(convolution kernel width KW)×(convolution kernel height KH)=9, that is, after the $5^{th}$ loop is repeated for 9 times, the data scheduler 203 has already selected the 1×128 cubes from 9 different positions of the convolution kernel K(1) and has completed the convolution operation with the input data IM. Then, the row-output accumulator ACR(m) uses the updated temporary value of the output accumulator ACR(m) as a convolution output point Z1, and the method stops the $5^{th}$ loop.

Figure 7D:
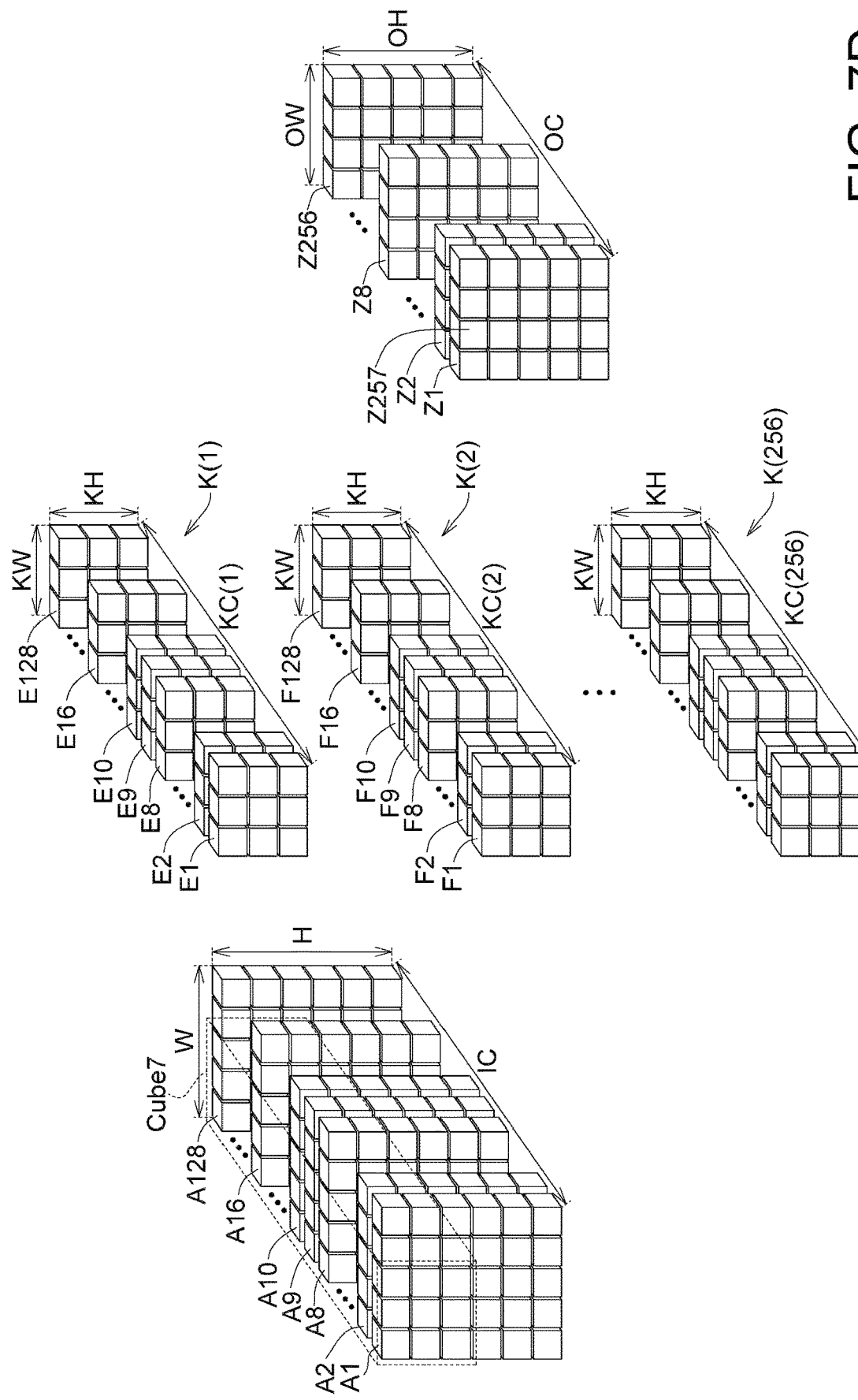
Figure 7E:
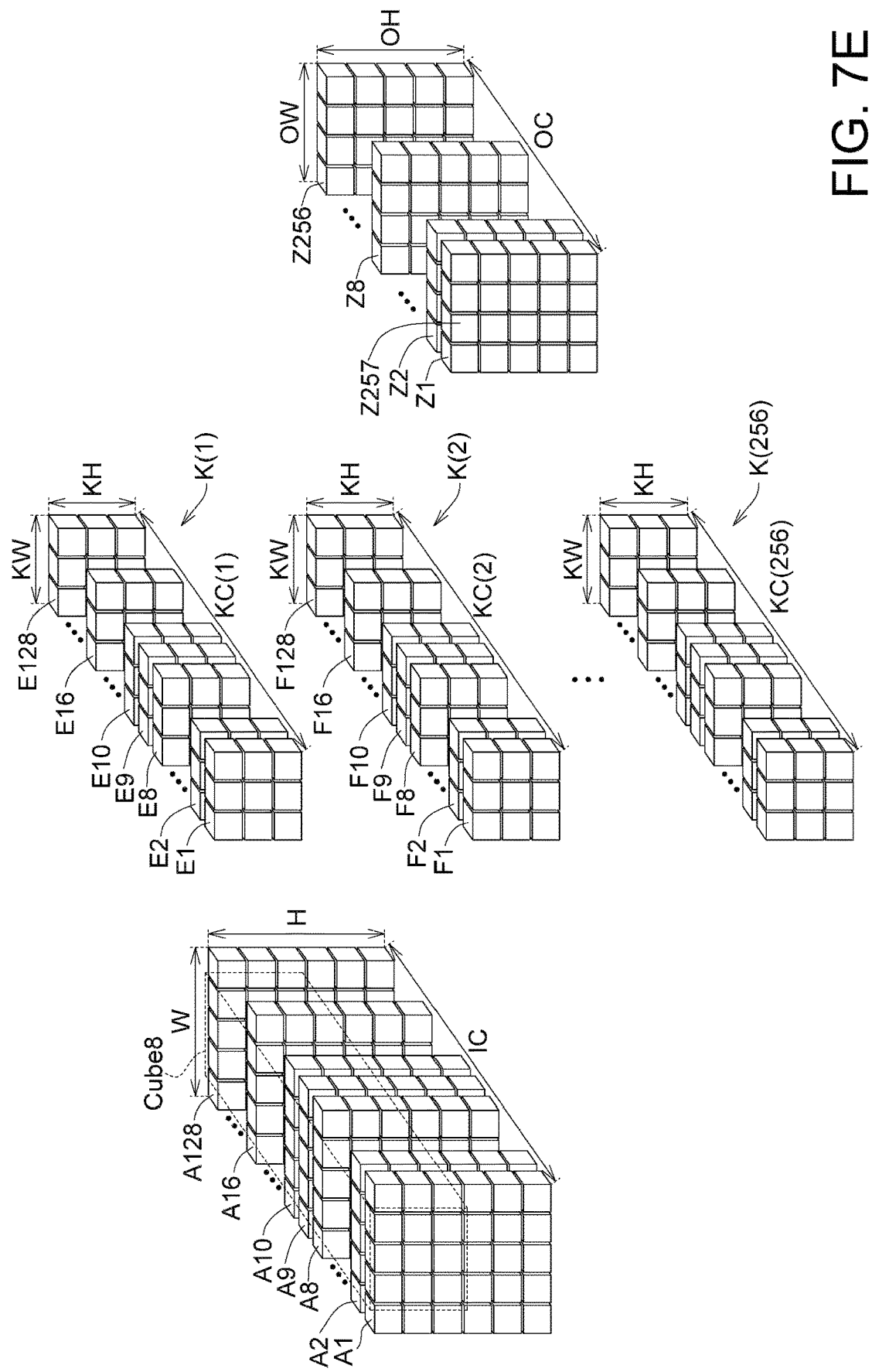

In the $6^{th}$ loop, convolution operation is performed to the convolution output results of different positions. As indicated in FIG. 7D, when the $6^{th}$ loop is performed for the first time, convolution operation is performed to the $7^{th}$ data value cube cube7 of the input data IM and the first convolution kernel K(1) to obtain a convolution output point Z1. The $7^{th}$ data value cube cube7 includes 3×3×128 data values. As indicated in FIG. 7E, when the $6^{th}$ loop is performed for the second time, the data scheduler 203 shifts the 3×3×128 cube of the input data IM rightward by 1 stride, and convolution operation is performed to the $8^{th}$ data value cube cube8 of the input data IM and the first convolution kernel K(1) to obtain a convolution output point Z257. Thus, each time when the $6^{th}$ loop is performed, the data scheduler 203 shifts the 3×3×128 cube rightward or downward by 1 stride, and selects the 3×3×128 data value cube from different positions of the input data IM to perform convolution operation with the first convolution kernel K(1). As indicated in FIG. 7A, the convolution output width OW of the convolution output result is 4, and the convolution output height OH is 5, therefore the $6^{th}$ loop needs to be performed for OW×OH=20 times, wherein OW represents the convolution output width and OH represents the convolution output height. Since the data scheduler 203 has selected the 3×3×128 data value cubes from 20 different positions and the row-output accumulator ACR(m) has completed 20 convolution output points, the criterion that Y2=OW×OH as indicated in step 544 is satisfied, and the method stops the $6^{th}$ loop.

In the $7^{th}$ loop, convolution operation is performed to different convolution kernels. As indicated in FIG. 7A, the convolution output channel OC is 256, each time the $7^{th}$ loop could process at most 8 (=MC, the number of multipliers per each column) convolution kernels. Thus, when the loop parameter Y1=(OC/MC), that is, after the $7^{th}$ loop is repeated for (OC/MC)=(256/8)=32 times, the method stops the $7^{th}$ loop, wherein OC represents the convolution output depth.

Thus, the $4^{th}$ loop needs to be repeated for (128/8)=16 times, the $5^{th}$ loop needs to be repeated for (3×3)=9 times, the $6^{th}$ loop needs to be repeated for (4×5)=20 times, the $7^{th}$ loop needs to be repeated for (256/8)=32 times, and in total there are (16×9×20×32)=92160 loops that need to be performed. That is, after 92160 clock cycles of operation, the convolutional neural-network calculating apparatus 200 of the present embodiment operation could complete the deep convolution operation of FIG. 7A.

Figure 8A:
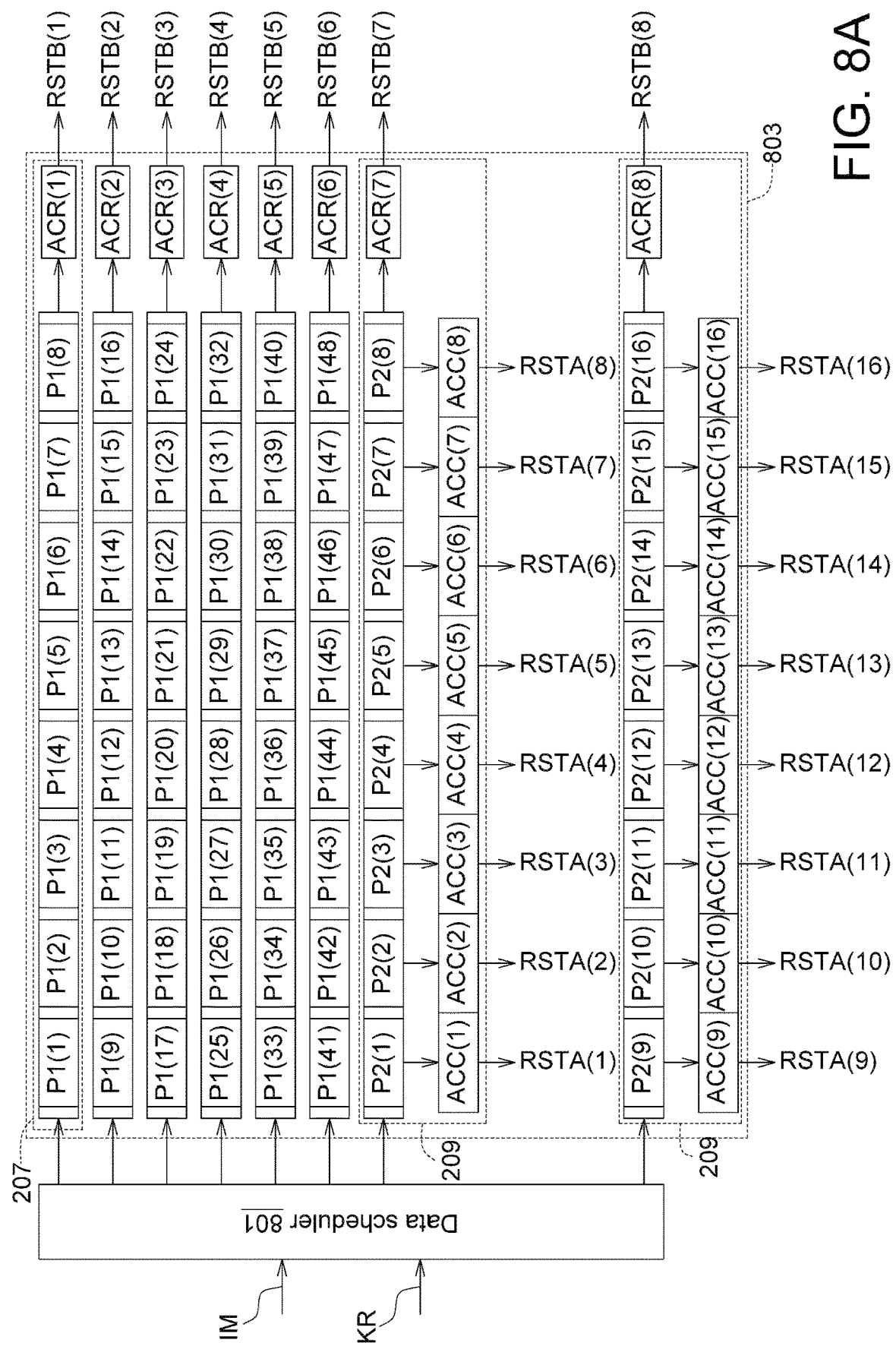
FIG. 8A is a block diagram of a convolutional neural-network calculating apparatus according to another embodiment of the present disclosure.

Referring to FIG. 8A, a block diagram of a convolutional neural-network calculating apparatus 200 according to another embodiment of the present disclosure is shown. Similarly, convolutional neural-network operation could be performed to an input data IM according to a number of convolution kernels KR. The convolutional neural-network calculating apparatus 200 includes a data scheduler 801 and an operation module array 803. The operation module array 803 has MC operation modules, wherein MC is a positive integer representing the number of multipliers per column. The MC operation module includes 2 bidirectional-output operation modules 17. Each bidirectional-output operation module 17 includes MR bidirectional multipliers, and each unidirectional operation module 207 includes MR unidirectional multipliers, wherein MR is a positive integer representing the number of multipliers per row.

In an embodiment as indicated in FIG. 8A, MC=8, MR=8, but another embodiment is not limited thereto. The operation module array 803 has 8 operation modules, wherein all of the first 6 operation modules are unidirectional operation modules 207, but the $7^{th}$ and the $8^{th}$ operation modules are bidirectional-output operation modules 17. Each unidirectional operation module 207 includes 8 unidirectional multipliers. Therefore, the first 6 unidirectional operation modules 207 include 48 unidirectional multipliers P1(1)~P1(48) in total. Each bidirectional-output operation module 17 includes 8 bidirectional multipliers. Therefore, the $7^{th}$ to the $8^{th}$ bidirectional-output operation modules 17 include 16 bidirectional multipliers P2(1)~P2(16) in total.

When the calculating apparatus is set to a depth-wise operation mode, like the data allocation arranged according to an embodiment as indicated in FIGS. 6A~6B, relevant convolution operations that each convolution kernel needs to perform are allocated to a bidirectional multiplier P2($i$) (or P2($i$+MR)) of the bidirectional-output operation modules 17 in the $7^{th}$ row and the $8^{th}$ row, wherein i is a positive integer between 1 and MR. The convolution operation result is outputted to the corresponding column-output accumulator ACC(i) and is accumulated by the corresponding column-output accumulator ACC(i) from the column-output port 27 of the bidirectional multiplier P2($i$), and the first convolution result RSTA(i) could be obtained from the column-output accumulator ACC(i). The unidirectional operation modules 207 in the first 6 rows of the operation module array 803 will not be used, and therefore could selectively enter a power saving mode to save power consumption.

When the calculating apparatus is set to the deep operation mode, like the data allocation arranged according to an embodiment as indicated in FIGS. 7A~7B, the 64 multipliers (including 48 unidirectional multipliers P1(1)~P1(48) and 16 bidirectional multipliers P2(1)~P2(16)) of the 8 operation modules of the operation module array 803 will be allocated to perform a part of the convolution operation, and the results are outputted to the corresponding row-output accumulator ACR(m) from respective row-output ports 25 of the 64 multipliers (including 48 unidirectional multipliers P1(1)~P1(48) and 16 bidirectional multipliers P2(1)~P2(16)), wherein m is a positive integer between 1 and MC. The row-output accumulator ACR(m) firstly adds up the 8 sub-products obtained by the coupled 8 multipliers in the first clock cycle to obtain a sum and further uses the sum as an original second convolution result RSTB(i). Then, the row-output accumulator ACR(m) adds up the sum of the 8 sub-products obtained by the 8 multipliers in each subsequent clock cycle to the original second convolution result RSTB(i) to obtain an updated second convolution result RSTB(i).

Figure 8B:
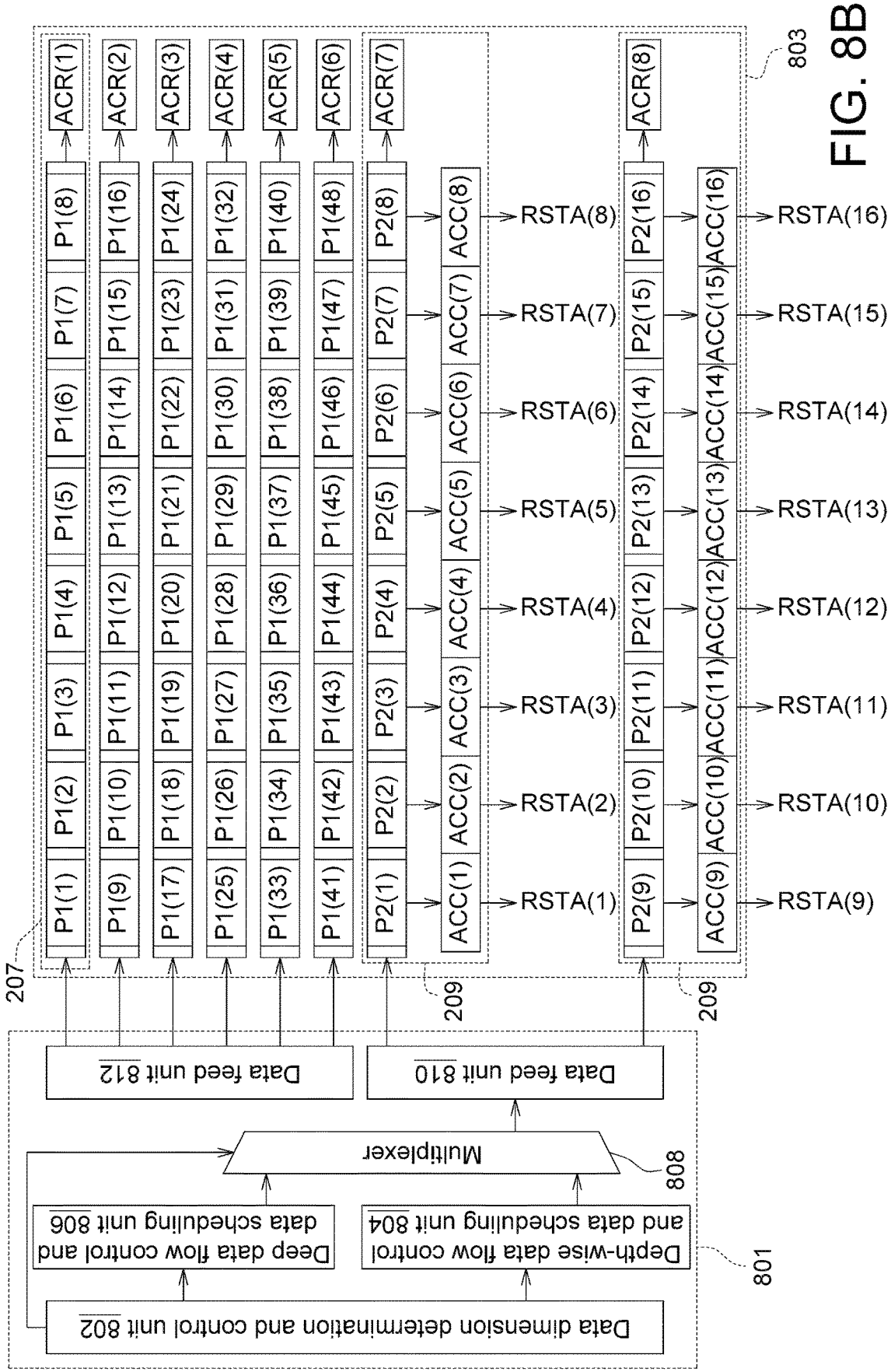
FIG. 8B is a block diagram of an example of detailed implementation of the convolutional neural-network calculating apparatus of FIG. 8A.

Referring to FIG. 8B, a block diagram of an example of detailed implementation of the convolutional neural-network calculating apparatus of FIG. 8A is shown. The data scheduler 801 could have different implementations. For example, the data scheduler 801 may include a data dimension determination and control unit 802, a first dimension data flow control and data scheduling unit (such as a depth-wise data flow control and data scheduling unit 804), a second dimension data flow control and data scheduling unit (such as a deep data flow control and data scheduling unit 806), a multiplexer 808, a data feed unit 810. The operations of the data scheduler 801 are similar to the operations of the data scheduler 203 of FIG. 2B but are different in that in each unit of the data scheduler 801, which data flow to output is determined by 2 rows of bidirectional multiplier P2 (such as bidirectional multipliers P2(1)~P2(16). That is, the depth-wise data flow control and data scheduling unit 804, in the first operation mode (such as the depth-wise operation mode), outputs the first data value data flow and the first convolution value data flow that are applicable to 2 rows of bidirectional multipliers P2 (such as bidirectional multipliers P2(1)~P2(16)) through the multiplexer 808 and the data feed unit 810 according to a number of data values of the input data and the convolution values of the convolution kernels to the 2 rows of bidirectional multipliers P2. The data feed unit 812, in the second operation mode (such as the deep operation mode), outputs the data value data flow and convolution value data flow applicable to 6 rows of unidirectional multipliers P1 according to a number of data values of the input data and the convolution values of the convolution kernels to the 6 rows of unidirectional multipliers P1.

Figure 9A:
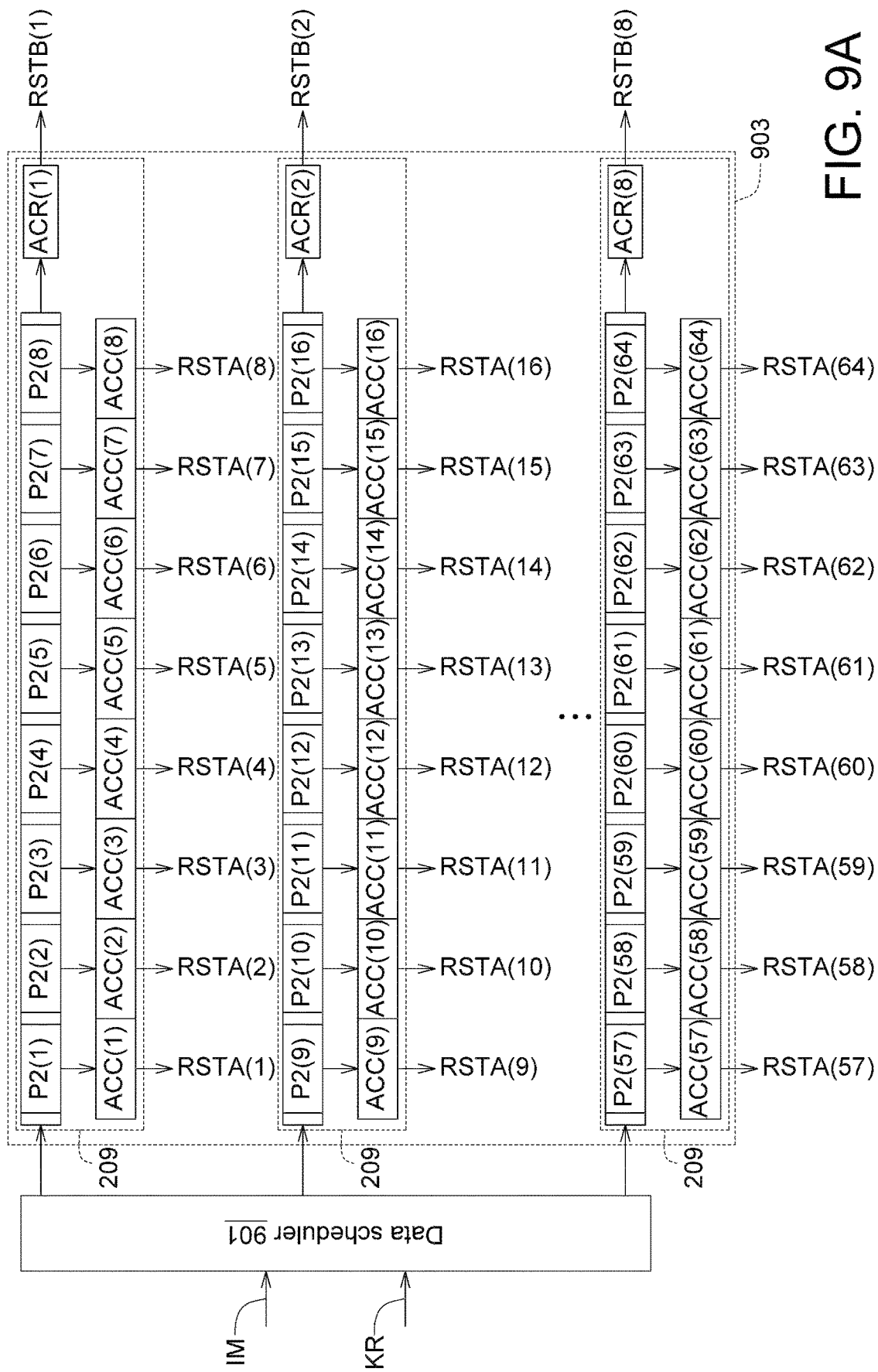
FIG. 9A is a block diagram of a convolutional neural-network calculating apparatus according to an alternate embodiment of the present disclosure.

Referring to FIG. 9A, a block diagram of a convolutional neural-network calculating apparatus 200 according to an alternate embodiment of the present disclosure is shown. For elements of the present embodiment similar or identical to that of above embodiments, similar or identical designations are used, and the similarities are not repeated. The operation module array 903 has MC operation modules, and all of the MC operation modules are bidirectional-output operation modules 17, wherein MC is a positive integer representing the number of multipliers per column. Each bidirectional-output operation module 17 includes MR bidirectional multipliers, wherein MR is a positive integer representing the number of multipliers per column. In an alternate embodiment as indicated in FIG. 9A, MC=8, MR=8, but another embodiment is not limited thereto. The operation module array 903 has 8 operation modules, and all of the 8 operation modules are bidirectional-output operation modules 17. Each bidirectional-output operation module 17 includes 8 bidirectional multipliers. Therefore, the 8 bidirectional-output operation modules 17 include 64 bidirectional multipliers P2(1)~P2(64) in total.

When the calculating apparatus is set to the depth-wise operation mode, like the data allocation arranged according to an embodiment as indicated in FIGS. 6A-6B, relevant convolution operations that each convolution kernel needs to perform are allocated to one bidirectional multiplier P2($i$) of the bidirectional-output operation modules 17 in the 8 rows for performing convolution operation, wherein i is a positive integer between 1 and MR. The result is outputted to the corresponding column-output accumulator ACC(i) and is accumulated by the corresponding column-output accumulator ACC(i) from the column-output port 27 of the bidirectional multiplier P2($i$), and the first convolution result RSTA(i) could be obtained from the column-output accumulator ACC(i). All of the bidirectional-output operation modules 17 of the operation module array 205 participate in and process a part of the convolution operation.

When the calculating apparatus is set to the deep operation mode, like the data allocation arranged according to an embodiment as indicated in FIGS. 7A~7B, the 64 multipliers of the 8 operation modules of the operation module array 903 participate in and process a part of the convolution operation, and the results are outputted to corresponding row-output accumulator ACR(m) from respective row-output ports 25 of the 64 multipliers, wherein m is a positive integer between 1 and MC. The row-output accumulator ACR(m) firstly adds up the 8 sub-products obtained by the coupled 8 multipliers in the first clock cycle to obtain a sum, and further uses the sum as an original second convolution result RSTB(i). Then, the row-output accumulator ACR(m) adds up the sum of the 8 sub-products obtained by the 8 multipliers in each subsequent clock cycle to the original second convolution result RSTB(i) to obtain an updated second convolution result RSTB(i).

Figure 9B:
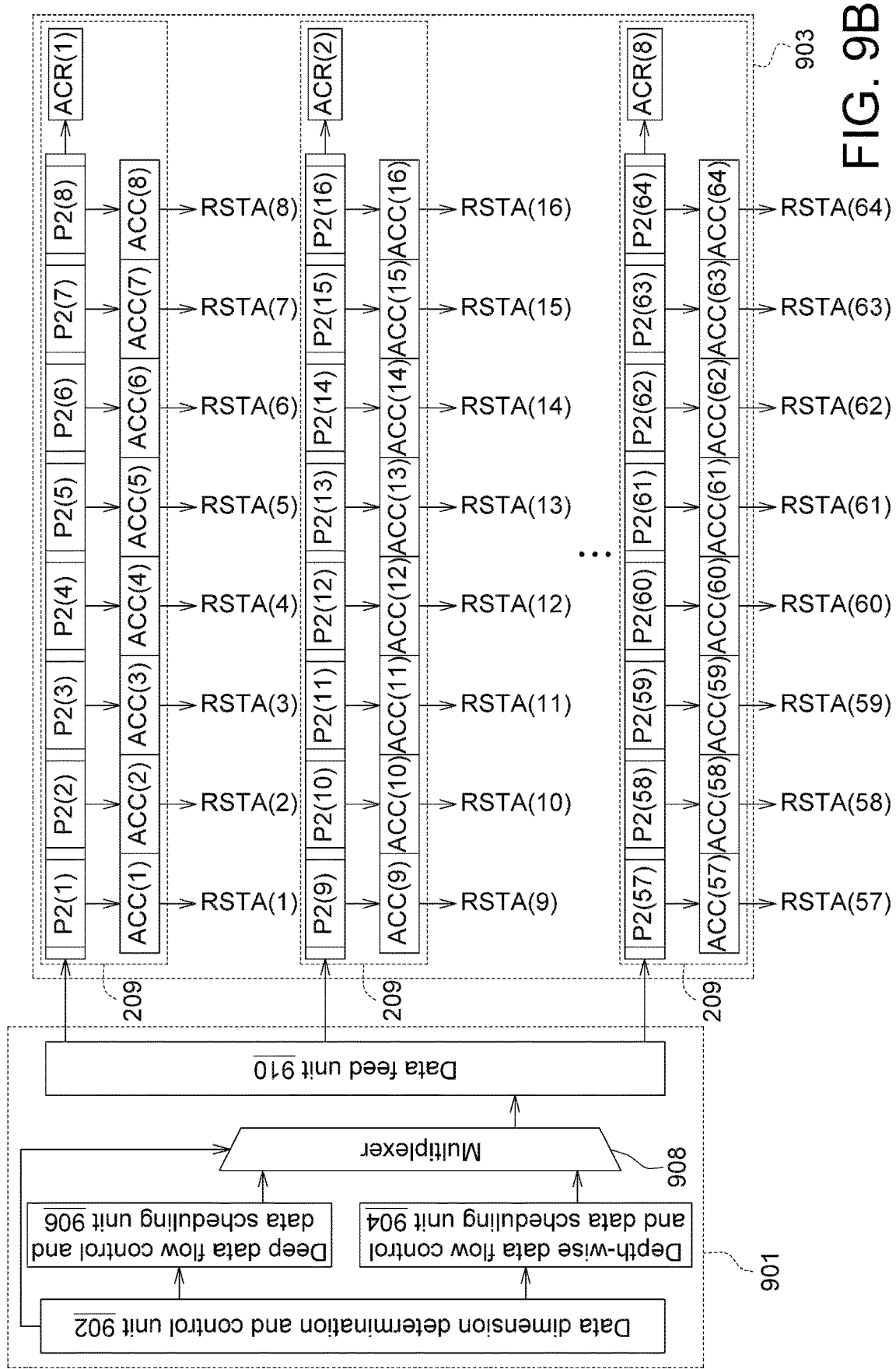
FIG. 9B is a block diagram of an example of detailed implementation of the convolutional neural-network calculating apparatus of FIG. 9A.

Referring to FIG. 9B, a block diagram of an example of detailed implementation of the convolutional neural-network calculating apparatus of FIG. 9A is shown. The data scheduler 901 could have different implementations. For example, the data scheduler 901 may include a data dimension determination and control unit 902, a first dimension data flow control and data scheduling unit (such as a depth-wise data flow control and data scheduling unit 904), a second dimension data flow control and data scheduling unit (such as a deep data flow control and data scheduling unit 906), a multiplexer 908, a data feed unit 910. The operations of the data scheduler 901 are similar to the operations of the data scheduler 203 of FIG. 2B but are different in that data flow to output is determined by 8 rows of bidirectional multiplier P2 (such as bidirectional multipliers P2(1)~P2(64) in each unit of the data scheduler 901. That is, the depth-wise data flow control and data scheduling unit 904, in the first operation mode (such as the depth-wise operation mode), outputs the first data value data flow and the first convolution value data flow applicable to 8 rows of bidirectional multipliers P2 to the bidirectional multipliers P2 (such as bidirectional multipliers P2(1)~P2(64) through the multiplexer 908 and the data feed unit 910 according to the data values of the input data and the convolution values of the convolution kernels.

With the bidirectional-output operation modules being used in the operation module array, the uni-input and bi-output multipliers being used in the bidirectional-output operation module, and different data flow allocation arranged by the data scheduler for the deep operation model and the depth-wise operation model, the convolutional neural-network calculating apparatus of the present disclosure could effectively process both the deep convolution operation and the depth-wise convolution operation. According to the embodiments of the present disclosure, the multipliers could maintain high efficiency of use in the deep convolution operation, and the unidirectional row multipliers and the row-output accumulators not engaged in the depth-wise convolution operation could selectively enter a power saving mode to save power consumption, and greatly increase the efficiency of use of multipliers. For example, the multipliers could only achieve a utilization rate of 1/64 when the conventional 8×8 neural-network calculating apparatus of FIG. 1 is used for processing depth-wise neural-network operation, but the utilization rate could achieve 64/64 when the neural-network calculating apparatus of FIG. 9A capable of processing both the deep convolution operation and the depth-wise convolution operation is used.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A convolutional neural-network calculating apparatus, comprising:
 a bidirectional-output operation module, comprising a plurality of bidirectional-output operators, a plurality of row-output accumulators, and a plurality of column-output accumulators, wherein each bidirectional-output operator has a row-output port and a column-output port, the row-output accumulators are coupled to the row-output ports, and the column-output accumulators are coupled to corresponding column-output ports; and
 a data scheduler configured to provide a plurality of values of an input data and a plurality of convolution values of a plurality of convolution kernels to the bidirectional-output operators;
 wherein in a first operation mode, the bidirectional-output operators output operation results to the corresponding column-output accumulators through the column-output ports, and in a second operation mode, the bidirectional-output operators output operation results to the row-output accumulators through the row-output ports.

2. The convolutional neural-network calculating apparatus according to claim 1, wherein the bidirectional-output operators comprise MR bidirectional multipliers P2(1)~P2(MR), the column-output accumulators comprise MR column-output accumulators ACC(1)~ACC(MR), when the convolutional neural-network calculating apparatus is set to the first operation mode, an $i^{th}$ bidirectional multiplier P2($i$) of the MR bidirectional multipliers outputs a $1^{st}$ sub-convolution operation result in a first clock cycle, and outputs a $2^{nd}$ sub-convolution operation result in a second clock cycle, the $i^{th}$ column-output accumulator ACC($i$) adds up the $1^{st}$ sub-convolution operation result and the $2^{nd}$ sub-convolution operation result, i is a positive integer between 1 and MR.

3. The convolutional neural-network calculating apparatus according to claim 2, wherein a height, a width, and a channel of the input data respectively are height H, width W, and channel IC, the height, the width, and the channel of each convolution kernel respectively are height KH, width KW, and channel KC, when the channel KC of the input data is less than a specific value, the convolutional neural-network calculating apparatus is set to the first operation mode, the first operation mode is a depth-wise operation mode.

4. The convolutional neural-network calculating apparatus according to claim 3, wherein when the convolutional neural-network calculating apparatus is set to the depth-wise operation mode, in the first clock cycle, the data scheduler selects a first convolution value of a first position on a plane defined by the height KH and the width KW of the convolution kernel, and selects a first data value corresponding to the first position on the plane defined by the height H and the width W of the input data, and the data scheduler outputs the first convolution value and the first data value to the $i^{th}$ bidirectional multiplier P2($i$) to obtain the $1^{st}$ sub-convolution operation result.

5. The convolutional neural-network calculating apparatus according to claim 4, wherein when the convolutional neural-network calculating apparatus is set to the depth-wise operation mode, in the second clock cycle, the data scheduler selects a second convolution value of a second position on the plane defined by the height KH and the width KW of the convolution kernel, and selects a second data value corresponding to the second position on the plane defined by the height H and the width W of the input data, and the data scheduler outputs the second convolution value and the second data value to the $i^{th}$ bidirectional multiplier P2($i$) to obtain the $2^{nd}$ sub-convolution operation result, the second position is different from the first position.

6. The convolutional neural-network calculating apparatus according to claim 5, wherein the second position is obtained by shifting the first position by q strides, q is a positive integer.

7. The convolutional neural-network calculating apparatus according to claim 2, wherein when the convolutional neural-network calculating apparatus is set to the second operation mode, the MR bidirectional multipliers P2(1)~P2(MR) output operation results through respective row-output ports, a $j^{th}$ bidirectional multiplier P2($j$) of the MR bidirectional multipliers outputs a $3^{rd}$ sub-convolution operation result in a third clock cycle and outputs a $4^{th}$ sub-convolution operation result in a $4^{th}$ clock cycle, a $k^{th}$ bidirectional multiplier P2($k$) of the MR bidirectional multipliers outputs a $5^{th}$ sub-convolution operation result in the third clock cycle and outputs a $6^{th}$ sub-convolution operation result in the $4^{th}$ clock cycle, the row-output accumulator adds up the $3^{rd}$ sub-convolution operation result, the $4^{th}$ sub-convolution operation result, the $5^{th}$ sub-convolution operation result, and the $6^{th}$ sub-convolution operation result, both j and k are a positive integer between 1 and MR.

8. The convolutional neural-network calculating apparatus according to claim 7, wherein the height, the width, and the channel of the input data respectively are height H, width W, and channel IC, the height, the width, and the channel of each convolution kernel respectively are height KH, width KW, and channel KC, the convolution kernels comprise a first convolution kernel K(1), when the channel KC of each convolution kernel is greater than or equivalent to a specific value, the convolutional neural-network calculating apparatus is set to the second operation mode, the second operation mode is a deep operation mode.

9. The convolutional neural-network calculating apparatus according to claim 8, wherein when the convolutional neural-network calculating apparatus is set to the deep operation mode, in the third clock cycle, the data scheduler selects a third position along a direction of the channel KC of the first convolution kernel K(1), obtains a third convolution value of the third position, and selects a third data value corresponding to the third position along a direction of the channel IC of the input data, and the data scheduler transmits the third convolution value and the third data value to the $j^{th}$ bidirectional multiplier P2(j) to obtain the $3^{rd}$ sub-convolution operation result, the data scheduler selects a $4^{th}$ position along the direction of the channel KC of the first convolution kernel K(1), obtains a $4^{th}$ convolution value of the $4^{th}$ position, and selects a $4^{th}$ data value corresponding to the $4^{th}$ position along the direction of the channel IC of the input data, and the data scheduler transmits the $4^{th}$ convolution value and the $4^{th}$ data value to the $k^{th}$ bidirectional multiplier P2(k) to obtain the $4^{th}$ sub-convolution operation result, the row-output accumulator adds up the $3^{rd}$ sub-convolution operation result and the $4^{th}$ sub-convolution operation result to obtain a temporary operation result, the third position is different from the $4^{th}$ position.

10. The convolutional neural-network calculating apparatus according to claim 9, wherein when the convolutional neural-network calculating apparatus is set to the deep operation mode, in the $4^{th}$ clock cycle, the data scheduler selects a $5^{th}$ position along the direction of the channel KC of the first convolution kernel K(1), obtains a $5^{th}$ convolution value of the $5^{th}$ position, and selects a $5^{th}$ data value corresponding to the $5^{th}$ position along the direction of the channel IC of the input data, the data scheduler transmits the $4^{th}$ convolution value and the $5^{th}$ data value to the $j^{th}$ bidirectional multiplier P2(j) to obtain the $5^{th}$ sub-convolution operation result, the data scheduler selects a $6^{th}$ position along the direction of the channel KC of the first convolution kernel K(1), obtains a $6^{th}$ convolution value of the $6^{th}$ position, and selects a $6^{th}$ data value corresponding to the $6^{th}$ position along the direction of the channel IC of the input data, and the data scheduler transmits the $6^{th}$ convolution value and the $6^{th}$ data value to the $k^{th}$ bidirectional multiplier P2(k) to obtain the $6^{th}$ sub-convolution operation result, the row-output accumulator adds up the $5^{th}$ sub-convolution operation result, the $6^{th}$ sub-convolution operation result, and the temporary operation result, the $5^{th}$ position is different from the $6^{th}$ position.

11. The convolutional neural-network calculating apparatus according to claim 1, wherein the data scheduler further comprises:
a data dimension determination and control unit;
a first dimension data flow control and data scheduling unit controlled by the data dimension determination and control unit and configured to output a first data value data flow and a first convolution value data flow according to the data values of the input data and the convolution values of the convolution kernels in a first operation mode;
a second dimension data flow control and data scheduling unit controlled by the data dimension determination and control unit and configured to output a second data value data flow and a second convolution value data flow corresponding to the second data value data flow according to the data values of the input data and the convolution values of the convolution kernels in a second operation mode;
a multiplexer coupled to the first dimension data flow control and data scheduling unit and the second dimension data flow control and data scheduling unit and configured to output the first data value data flow and the first convolution value data flow in the first operation mode and to output the second data value data flow and the second convolution value data flow in the second operation mode; and
a data feed unit coupled to the multiplexer and configured to output the first data value data flow and the first convolution value data flow to the bidirectional-output operators in the first operation mode and to output the second data value data flow and the second convolution value data flow to the bidirectional-output operators in the second operation mode.

12. An operation method of a convolutional neural-network, comprising:
providing a bidirectional-output operation module comprising a plurality of bidirectional-output operators, a plurality of row-output accumulators, and a plurality of column-output accumulators, wherein each bidirectional-output operator has a row-output port and a column-output port, the row-output accumulators are coupled to the row-output ports, and the column-output accumulators are coupled to corresponding column-output ports;
providing a plurality of data values of an input data and a plurality of convolution values of a plurality of convolution kernels to the bidirectional-output operators by a data scheduler;
outputting operation results to the corresponding column-output accumulators through the column-output ports by the bidirectional-output operators in a first operation mode; and
outputting operation results to the row-output accumulators through the row-output ports by the bidirectional-output operators in a second operation mode.

13. The method according to claim 12, wherein the bidirectional-output operators comprise MR bidirectional multipliers P2(1)~P2(MR), the column-output accumulators comprise MR column-output accumulators ACC(1)~ACC(MR), when the convolutional neural-network calculating apparatus is set to the first operation mode, an $i^{th}$ bidirectional multiplier P2(i) of the MR bidirectional multipliers outputs a $1^{st}$ sub-convolution operation result in a first clock cycle and outputs a $2^{nd}$ sub-convolution operation result in a second clock cycle, the $i^{th}$ column-output accumulator ACC(i) adds up the $1^{st}$ sub-convolution operation result and the $2^{nd}$ sub-convolution operation result, i is a positive integer between 1 and MR.

14. The method according to claim 13, wherein a height, a width, and a channel of the input data respectively are height H, width W, and channel IC, the height, the width, and the channel of each convolution kernel respectively are height KH, width KW, and channel KC, when the channel KC of each convolution kernel is less than a specific value, the convolutional neural-network calculating apparatus is set to the first operation mode, the first operation mode is a depth-wise operation mode.

15. The method according to claim 14, wherein when the convolutional neural-network calculating apparatus is set to the depth-wise operation mode, in the first clock cycle, the data scheduler selects a first convolution value of a first position on a plane defined by the height KH and the width KW of the convolution kernel, and selects a first data value corresponding to the first position on the plane defined by the height H and the width W of the input data, and the data scheduler outputs the first convolution value and the first data value to the $i^{th}$ bidirectional multiplier P2($i$) to obtain the $1^{st}$ sub-convolution operation result.

16. The method according to claim 15, wherein when the convolutional neural-network calculating apparatus is set to the depth-wise operation mode, in the second clock cycle, the data scheduler selects a second convolution value of a second position on the plane defined by the height KH and the width KW of the convolution kernel, and selects a second data value corresponding to the second position on the plane defined by the height H and the width W of the input data, and the data scheduler outputs the second convolution value and the second data value to the $i^{th}$ bidirectional multiplier P2($i$) to obtain the $2^{nd}$ sub-convolution operation result, and the second position is different from the first position.

17. The method according to claim 16, wherein, the second position is obtained by shifting the first position by q strides, q is a positive integer.

18. The method according to claim 13, wherein when the convolutional neural-network calculating apparatus is set to the second operation mode, the MR bidirectional multipliers P2(1)~P2(MR) output operation results through respective row-output ports, a $j^{th}$ bidirectional multiplier P2($j$) of the MR bidirectional multipliers outputs a $3^{rd}$ sub-convolution operation result in a third clock cycle and outputs a $4^{th}$ sub-convolution operation result in a $4^{th}$ clock cycle, a $k^{th}$ bidirectional multiplier P2($k$) of the MR bidirectional multipliers outputs a $5^{th}$ sub-convolution operation result in the third clock cycle and outputs a $6^{th}$ sub-convolution operation result in the $4^{th}$ clock cycle, the row-output accumulator adds up the $3^{rd}$ sub-convolution operation result, the $4^{th}$ sub-convolution operation result, the $5^{th}$ sub-convolution operation result, and the $6^{th}$ sub-convolution operation result, both j and k are a positive integer between 1 and MR.

19. The method according to claim 18, wherein the height, the width, and the channel of the input data respectively are height H, width W, and channel IC, the height, the width, and the channel of each convolution kernel respectively are height KH, width KW, and channel KC, the convolution kernels comprise a first convolution kernel K(1), when the channel KC of each convolution kernel is greater than or equivalent to a specific value, the convolutional neural-network calculating apparatus is set to the second operation mode, the second operation mode is a deep operation mode.

20. The method according to claim 19, wherein when the convolutional neural-network calculating apparatus is set to the deep operation mode, the data scheduler, in the third clock cycle, selects a third position along a direction of the channel KC of the first convolution kernel K(1), obtains a third convolution value of the third position, and selects a third data value corresponding to the third position along a direction of the channel IC of the input data, and the data scheduler transmits the third convolution value and the third data value to the $j^{th}$ bidirectional multiplier P2($j$) to obtain the $3^{rd}$ sub-convolution operation result, the data scheduler selects a $4^{th}$ position along the direction of the channel KC of the first convolution kernel K(1), obtains a $4^{th}$ convolution value of the $4^{th}$ position, and selects a $4^{th}$ data value corresponding to the $4^{th}$ position along the direction of the channel IC of the input data, and the data scheduler transmits the $4^{th}$ convolution value and the $4^{th}$ data value to the $k^{th}$ bidirectional multiplier P2($k$) to obtain the $4^{th}$ sub-convolution operation result, the row-output accumulator adds up the $3^{rd}$ sub-convolution operation result and the $4^{th}$ sub-convolution operation result to obtain a temporary operation result.

21. The method according to claim 20, wherein when the convolutional neural-network calculating apparatus is set to the deep operation mode, the data scheduler, in the $4^{th}$ clock cycle, selects a $5^{th}$ position along the direction of the channel KC of the first convolution kernel K(1), obtains a $5^{th}$ convolution value of the $5^{th}$ position, and selects a $5^{th}$ data value corresponding to the $5^{th}$ position along the direction of the channel IC of the input data, and the data scheduler transmits the $4^{th}$ convolution value and the $5^{th}$ data value to the $j^{th}$ bidirectional multiplier P2($j$) to obtain the $5^{th}$ sub-convolution operation result, the data scheduler selects a $6^{th}$ position along the direction of the channel KC of the first convolution kernel K(1), obtains a $6^{th}$ convolution value of the $6^{th}$ position, selects a $6^{th}$ data value corresponding to the $6^{th}$ position along the direction of the channel IC of the input data, and the data scheduler transmits the $6^{th}$ convolution value and the $6^{th}$ data value to the $k^{th}$ bidirectional multiplier P2($k$) to obtain the $6^{th}$ sub-convolution operation result, the row-output accumulator adds up the $5^{th}$ sub-convolution operation result, the $6^{th}$ sub-convolution operation result, and the temporary operation result.

22. The method according to claim 12, further comprising:
outputting a first data value data flow and a first convolution value data flow to a multiplexer according to the data values of the input data and the convolution values of the convolution kernels in a first operation mode;
outputting a second data value data flow and a second convolution value data flow according to the data values of the input data and the convolution values of the convolution kernels in a second operation mode;
outputting the first data value data flow and the first convolution value data flow to a data feed unit by the multiplexer in the first operation mode, and outputting the second data value data flow and the second convolution value data flow to the data feed unit by the multiplexer in the second operation mode; and
outputting the first data value data flow and the first convolution value data flow to the bidirectional-output operators by the data feed unit in the first operation mode, and outputting the second data value data flow and the second convolution value data flow to the bidirectional-output operators by the data feed unit in the second operation mode.

* * * * *